(12) United States Patent
Nam et al.

(10) Patent No.: US 12,469,958 B2
(45) Date of Patent: Nov. 11, 2025

(54) ELECTRONIC DEVICE INCLUDING STRUCTURE IN WHICH KEY BUTTON AND ANTENNA MODULE OVERLAP

(71) Applicant: Samsung Electronics Co., Ltd., Suwon-si (KR)

(72) Inventors: In Nam, Suwon-si (KR); Daeyoung Noh, Suwon-si (KR); Jongdoo Kim, Suwon-si (KR); Daeseung Park, Suwon-si (KR); Kyoungho Bae, Suwon-si (KR); Younghwan Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 18/440,028

(22) Filed: Feb. 13, 2024

(65) Prior Publication Data

US 2024/0186682 A1    Jun. 6, 2024

Related U.S. Application Data

(63) Continuation of application No. PCT/KR2022/013215, filed on Sep. 2, 2022.

(30) Foreign Application Priority Data

Oct. 5, 2021   (KR) .................. 10-2021-0132023
Nov. 2, 2021   (KR) .................. 10-2021-0149272

(51) Int. Cl.
*H01Q 1/24*       (2006.01)
*H01Q 1/38*       (2006.01)
(Continued)

(52) U.S. Cl.
CPC ............ *H01Q 1/243* (2013.01); *H04M 1/026* (2013.01)

(58) Field of Classification Search
CPC .......... H01Q 1/243; H01Q 1/38; H01Q 21/08; H01Q 9/0407; H01Q 21/065;
(Continued)

(56) References Cited

U.S. PATENT DOCUMENTS 8,395,553 B2    3/2013   Oh
8,587,485 B2    11/2013  Tahk et al.
(Continued)

FOREIGN PATENT DOCUMENTS

JP    2011-166644 A    8/2011
KR    10-0543619 B1    1/2006
(Continued)

OTHER PUBLICATIONS

International Search Report dated Dec. 6, 2022, issued in International Patent Application No. PCT/KR2022/013215.

*Primary Examiner* — Wei (Victor) Y Chan
(74) *Attorney, Agent, or Firm* — Jefferson IP Law, LLP

(57) ABSTRACT

An electronic device is provided. The electronic device includes a housing, a key button structure in the housing, and a plurality of antenna elements spaced apart from the key button structure into an inner space. The key button structure includes a flexible printed circuit board, and a dome which is pressed by at least one key button when the at least one key button moves into the inner space, and electrically connected to the flexible printed circuit board. When the key button structure is vertically viewed, an antenna module may overlap a portion of the flexible printed circuit board.

20 Claims, 14 Drawing Sheets

(51) Int. Cl.
  *H01Q 21/08* (2006.01)
  *H04M 1/02* (2006.01)

(58) Field of Classification Search
  CPC .......... H01Q 1/2283; H01Q 1/24; H01Q 1/02;
      H01Q 1/48; H01Q 21/28; H01Q 1/42;
      H01Q 21/062
  See application file for complete search history.

(56) References Cited

U.S. PATENT DOCUMENTS

| | | | |
|---|---|---|---|
| 10,243,258 B2 * | 3/2019 | Woo | H01Q 1/24 |
| 10,306,029 B1 * | 5/2019 | Hwang | H04M 1/0202 |
| 10,439,268 B2 * | 10/2019 | Son | H04B 1/385 |
| 11,025,761 B1 * | 6/2021 | Shim | H04M 1/0202 |
| 11,349,207 B2 | 5/2022 | Kim et al. | |
| 11,600,897 B2 | 3/2023 | Moon et al. | |
| 2006/0192714 A1 * | 8/2006 | Koyama | H04M 1/0202 |
| | | | 343/702 |
| 2008/0074329 A1 * | 3/2008 | Caballero | H01Q 1/088 |
| | | | 343/702 |
| 2010/0033384 A1 * | 2/2010 | Abe | H05K 9/003 |
| | | | 343/702 |
| 2010/0232122 A1 * | 9/2010 | Chen | H04M 1/236 |
| | | | 361/752 |
| 2011/0255259 A1 | 10/2011 | Weber et al. | |
| 2011/0255260 A1 * | 10/2011 | Weber | H01H 13/04 |
| | | | 200/341 |
| 2016/0028148 A1 * | 1/2016 | Tan | H01Q 1/44 |
| | | | 343/702 |
| 2017/0245376 A1 * | 8/2017 | Song | H01H 13/84 |
| 2017/0347470 A1 * | 11/2017 | Seo | G06F 1/1626 |
| 2021/0367319 A1 | 11/2021 | Moon et al. | |
| 2022/0069443 A1 * | 3/2022 | Jeon | H04M 1/0249 |
| 2023/0080343 A1 * | 3/2023 | Lee | H01Q 21/0025 |
| | | | 343/702 |

FOREIGN PATENT DOCUMENTS

| | | |
|---|---|---|
| KR | 10-2006-0036530 A | 5/2006 |
| KR | 10-0720939 B1 | 5/2007 |
| KR | 10-0785355 B1 | 12/2007 |
| KR | 10-1261997 B1 | 5/2013 |
| KR | 10-1408654 B1 | 6/2014 |
| KR | 10-1552155 B1 | 9/2015 |
| KR | 10-2068570 B1 | 1/2020 |
| KR | 10-2020-0092719 A | 8/2020 |
| KR | 10-2021-0093198 A | 7/2021 |
| KR | 10-2462850 B1 | 10/2022 |

\* cited by examiner

ELECTRONIC DEVICE INCLUDING STRUCTURE IN WHICH KEY BUTTON AND ANTENNA MODULE OVERLAP

CROSS-REFERENCE TO RELATED APPLICATION(S)

This application is a continuation application, claiming priority under § 365(c), of an International application No. PCT/KR2022/013215, filed on Sep. 2, 2022, which is based on and claims the benefit of a Korean patent application number 10-2021-0132023, filed on Oct. 5, 2021, in the Korean Intellectual Property Office, and of a Korean patent application number 10-2021-0149272, filed on Nov. 2, 2021, in the Korean Intellectual Property Office, the disclosure of each of which is incorporated by reference herein in its entirety.

BACKGROUND

1. Field

The disclosure relates to an electronic device including an overlapping structure of a key button and an antenna module. More particularly, the disclosure relates an electronic device that can reduce degraded radiation of the antenna module, while securing a larger mounting space for the electronic device, utilizing an overlapping structure of the key buttons and the antenna module.

2. Description of Related Art

The core performance of 5th generation (5G) communications may include high speed, low latency, or ultra-connectivity. The 5G communications may support not only a sub-6 GHZ frequency band typically used in wireless communication, but also a millimeter-wave (mmWave) band, which is a higher frequency band above 24 GHZ.

Antenna modules may meet the performance requirements of 5G communications in such a high frequency band, by using beamforming for concentrating signals in a specific direction. According to a beamforming operation of a narrow beam width with directivity, an antenna module is required to have efficient arrangement for transmission and reception of signals inside an electronic device.

The above information is presented as background information only to assist with an understanding of the disclosure. No determination has been made, and no assertion is made, as to whether any of the above might be applicable as prior art with regard to the disclosure.

SUMMARY

Antenna modules that use a directional beamforming technology is sensitive to any obstructions. The communication performance of an electronic device is degraded, if an object that interferes with propagation of signals is placed in a path of transmission or reception of the signals. Key buttons disposed on a side of an electronic device interfere with an antenna module ability to transmit or receive signals. The key buttons and the antenna module are disposed in a position that does not overlap each other to avoid reduced communication performance of the electronic device. The electronic device presents design challenges due to some limitations on the placement relationship of the antenna module and the key buttons in its internal space.

Aspects of the disclosure are to address at least the above-mentioned problems and/or disadvantages and to provide at least the advantages described below provide an electronic device that can reduce degraded radiation of the antenna module, while securing a larger mounting space for the electronic device, utilizing an overlapping structure of the key buttons and the antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface on which a display is disposed, a second surface facing in a direction opposite to the first surface, and a side surface forming an internal space by surrounding a space between the first surface and the second surface, a key button structure in the housing at least partially exposed to the side surface, and an antenna module spaced from the key button structure to the internal space and including a plurality of antenna elements, wherein the key button structure includes at least one key button partially exposed to the side surface, and capable of moving into the internal space when pressed, a flexible printed circuit board comprising a ground portion, and disposed between the at least one key button and the antenna module, and a dome pressed by the at least one key button as the at least one key button moves into the internal space, electrically connected to the flexible printed circuit board, and disposed on a region of the flexible printed circuit board, the region of the flexible printed circuit board corresponding to at least one region among regions of the antenna module located between each of the plurality of antenna elements, and wherein the antenna module overlaps a portion of the flexible printed circuit board, when the key button structure is viewed perpendicularly.

In accordance with another aspect of the disclosure, an electronic device is provided. The electronic device includes a display, a cover plate disposed opposite to the display, a housing including a first surface on which the display is disposed, a second surface on which the cover plate is disposed, and a side surface disposed between the first surface and the second surface, an antenna module in the housing including a plurality of antenna elements, a flexible printed circuit board disposed between the side surface and the antenna module, and comprising a conductive thin film, and a dome electrically connected to the conductive film by an external force, and disposed on a region of the flexible printed circuit board, the region of the flexible printed circuit board corresponding to at least one region among regions of the antenna module located between each of the plurality of antenna elements, wherein the antenna module is directed to between the cover plate and the side surface to transmit a signal emitted from the plurality of antenna elements to an outside of the electronic device.

An electronic device including a structure in which a key button structure and an antenna module overlap each other is positioned at a position in which the key button structure and the antenna module overlap each other. The electronic device has an arrangement structure in which the key button structure does not interfere with signal transmission and reception of the antenna module, thereby alleviating restrictions on an internal space of the electronic device, securing a mounting space for other components, and reducing degradation in radiation performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
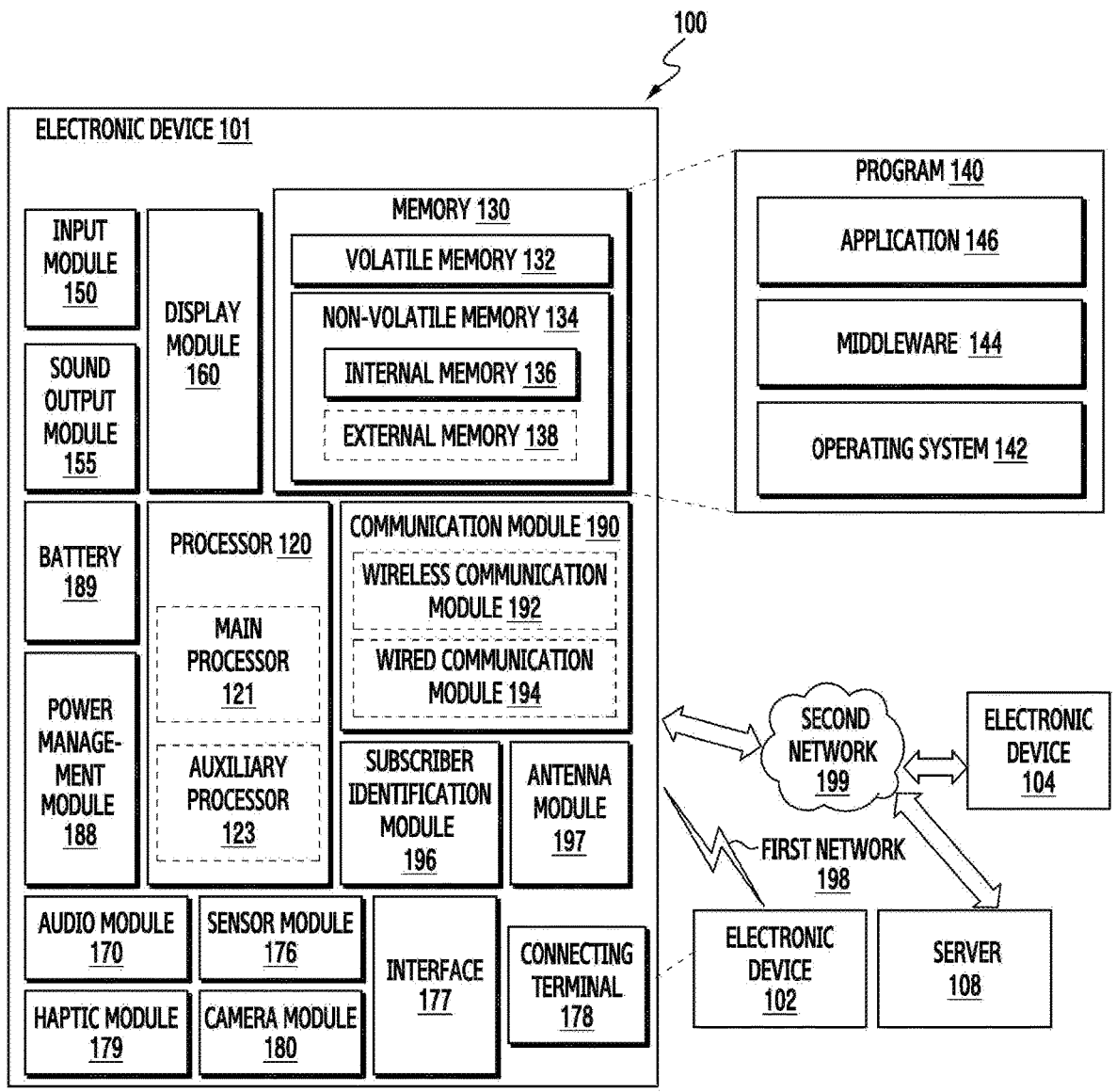
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
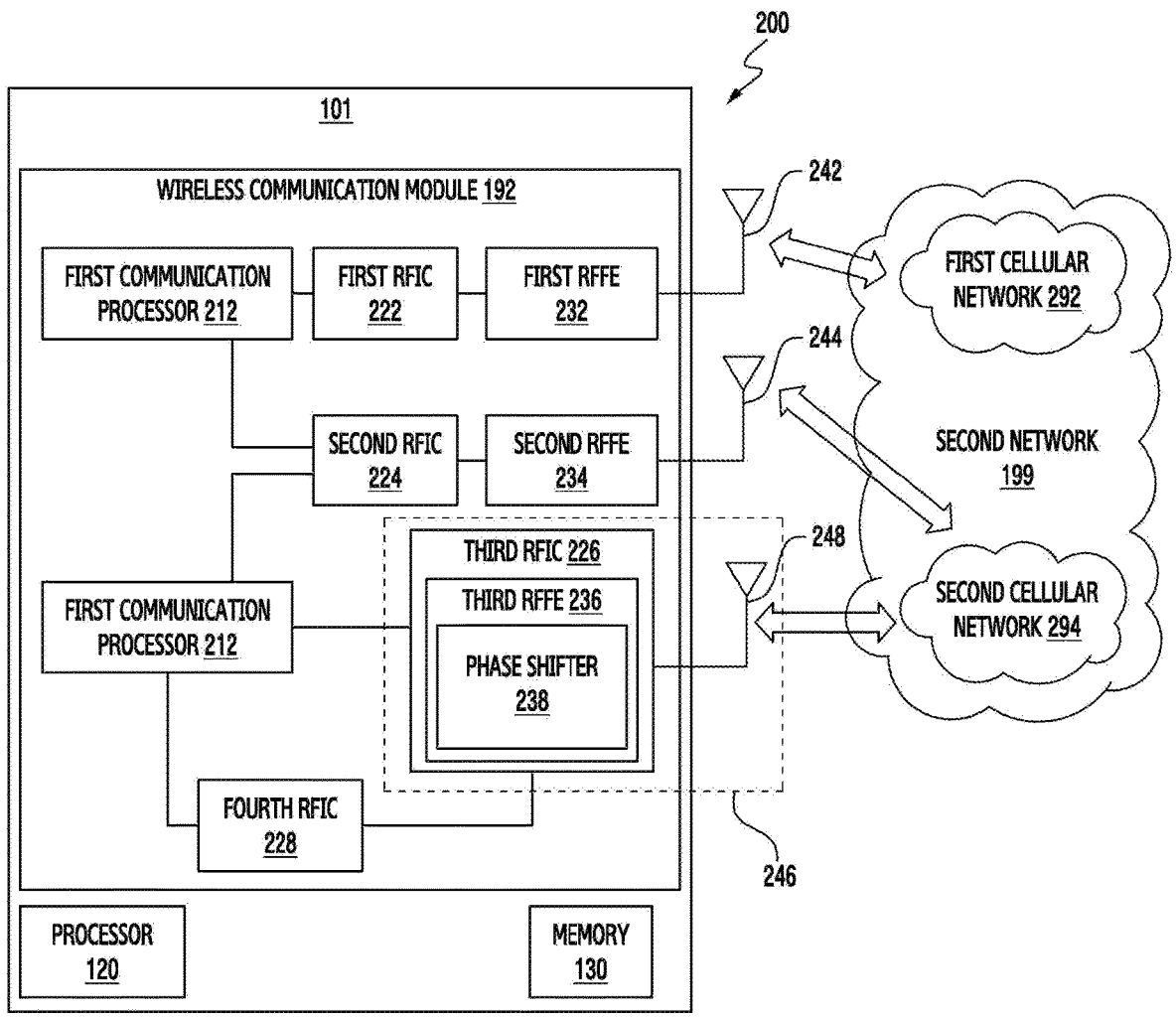
FIG. 2 is a block diagram of an electronic device for supporting legacy network communication and 5G network communication according to an embodiment of the disclosure.

FIG. 2 is a block diagram 200 of an electronic device for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment of the disclosure, the electronic device 101 may further include at least one of the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment of the disclosure, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various embodiments of the disclosure, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHZ to 60 GHZ) among bands to be used for wireless communication with the second cellular network 294, and 5G network communication through the established communication channel. According to various embodiments of the disclosure, the second cellular network 294 may be a 5G network defined by third generation partnership project (3GPP). Additionally, according to an embodiment of the disclosure, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be formed with the processor 120, the coprocessor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHZ) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment of the disclosure, the third RFFE 236 may be formed as a part of the third RFIC 226.

According to an embodiment of the disclosure, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHZ), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment of the disclosure, the first RFIC 222 and the second RFIC 224 may be implemented as a single chip or at least a part of a single package. According to an embodiment of the disclosure, the first RFFE 232 and the second RFFE 234 may be implemented as a single chip or at least a part of a single package. According to an embodiment of the disclosure, at least one of the first antenna module 242 or the second antenna module 244 may be omitted or combined with another antenna module to process RF signals of a plurality of corresponding bands.

According to an embodiment of the disclosure, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment of the disclosure, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHZ) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
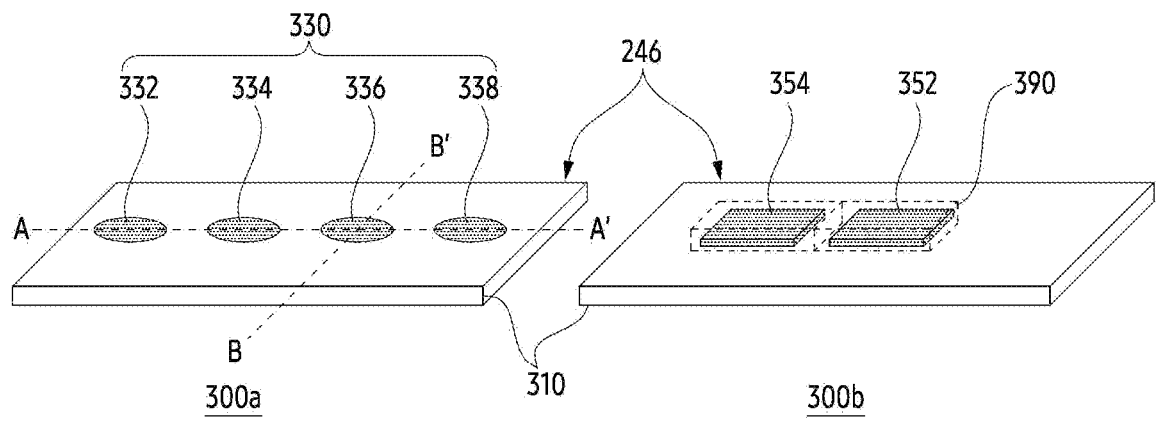
FIG. 3 is a diagram illustrating an embodiment of a structure of a third antenna module described with reference to FIG. 2 according to an embodiment of the disclosure.
Figure 3:
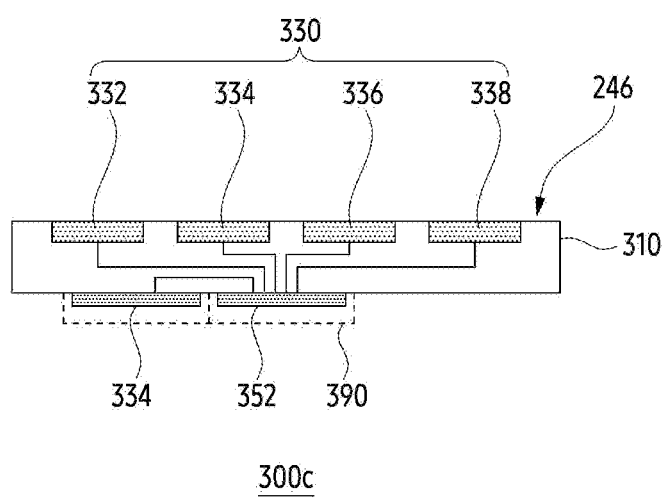

FIG. 3 illustrates, for example, an embodiment of a structure of the third antenna module 246 described with reference to FIG. 2 according to an embodiment of the disclosure. 300a of FIG. 3 is a perspective view of the third antenna module 246 as viewed from one side, and 300b of FIG. 3 is a perspective view of the third antenna module 246 as viewed from the other side. 300c of FIG. 3 is a cross-sectional view of A-A' of the third antenna module 246.

Referring to FIG. 3, in an embodiment of the disclosure, the third antenna module 246 may include a printed circuit board 310, an antenna array 330, a radio frequency integrated circuit (RFIC) 352, and a power manage integrated circuit (PMIC) 354, and a module interface (not shown). The third antenna module 246 may further optionally include a shielding member 390. In other embodiments of the disclosure, at least one of the aforementioned parts may be omitted, or at least two of the parts may be integrally formed.

The printed circuit board 310 may include a plurality of conductive layers and a plurality of non-conductive layers alternately stacked with the conductive layers. The printed circuit board 310 may provide electrical connection between various electronic components disposed on the printed circuit board 310 and/or outside, by using wires and conductive vias formed on the conductive layer.

The antenna array 330 (e.g., 248 in FIG. 2) may include a plurality of antenna elements 332, 334, 336, or 338 arranged to form a directional beam. The antenna elements may be formed on a first surface of the printed circuit board 310 as illustrated. According to another embodiment of the disclosure, the antenna array 330 may be formed inside the printed circuit board 310. According to embodiments of the disclosure, the antenna array 330 may include a plurality of antenna arrays (e.g., a dipole antenna array and/or a patch antenna array) of the same or different shape or type.

The RFIC 352 (e.g., the third RFIC 226 in FIG. 2) may be disposed in another region of the printed circuit board 310 (e.g., a second surface opposite to the first surface), spaced apart from the antenna array 330. The RFIC 352 may be configured to process a signal of a selected frequency band that is transmitted and received via the antenna array 330. According to an embodiment of the disclosure, upon transmission, the RFIC 352 may convert a baseband signal obtained from a communication processor (not illustrated) into an RF signal of a specified band. Upon reception, the RFIC 352 may convert an RF signal received via the antenna array 330 into a baseband signal and transmit the converted signal to the communication processor.

According to another embodiment of the disclosure, upon transmission, the RFIC 352 may up-convert an IF signal (e.g., approximately 9 GHz to approximately 11 GHZ) obtained from an intermediate frequency integrated circuit (IFIC) (e.g., the fourth RFIC 228 in FIG. 2) into the RF signal of the selected band. Upon reception, the RFIC 352 may down-convert the RF signal obtained via the antenna array 330 into an IF signal, and transmit the converted signal to the IFIC.

The PMIC 354 may be disposed in another partial region (e.g., the second surface) of the printed circuit board 310, spaced apart from the antenna array. The PMIC 354 may receive a voltage from a main PCB (not shown) and provide power required for various components (e.g., the RFIC 352) on antenna modules.

The shielding member 390 may be disposed on a part (e.g., the second surface) of the printed circuit board 310 in order to electromagnetically shield at least one of the RFIC 352 and the PMIC 354. According to an embodiment of the disclosure, the shielding member 390 may include a shield can.

Although not illustrated, in various embodiments of the disclosure, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 352 and/or the PMIC 354 of the third antenna module 246 may be electrically connected to the printed circuit board.

Figure 4:
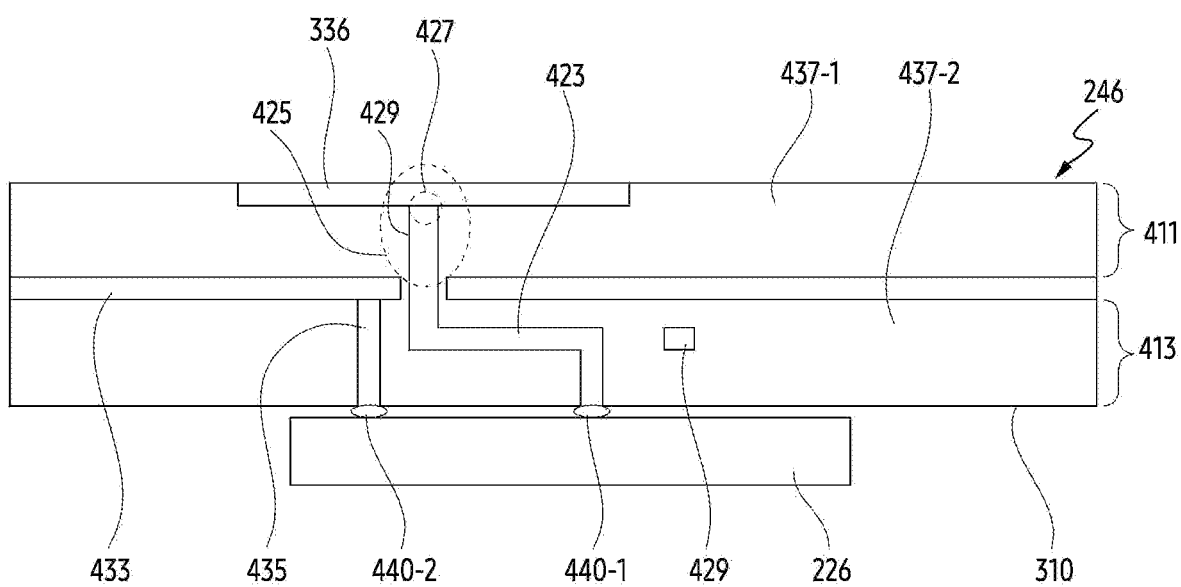
FIG. 4 is a diagram illustrating a cross-sectional view taken along line B-B' of a third antenna module 300a of FIG. 3 according to an embodiment of the disclosure.

FIG. 4 illustrates a cross-section taken along line B-B' of the third antenna module 246 of 300a of FIG. 3 according to an embodiment of the disclosure. A printed circuit board 310 of the illustrated embodiment may include an antenna layer 411 and a network layer 413.

The antenna layer 411 may include at least one dielectric layer 437-1, and an antenna element 336 and/or a feeding unit 425 formed on the outer surface of or inside of the dielectric layer. The feeding unit 425 may include a feeding point 427 and/or a feeding line 429.

The network layer 413 may include at least one dielectric layer 437-2, at least one ground layer 433 formed on the outer surface of or inside of the dielectric layer, at least one conductive via 435, and/or a transmission line 423.

In addition, in the illustrated embodiment of the disclosure, the third RFIC 226 may be electrically connected to the network layer 413, for example, through first and second connecting portions (solder bumps) 440-1 and 440-2. In other embodiments of the disclosure, various connecting structures (e.g., solder or ball grid array (BGA)) may be used instead of the connecting portions. The third RFIC 226 may be electrically connected to the antenna element 336 via a first connecting portion 440-1, the transmission line 423, and the feeding unit 425. The third RFIC 226 may also be electrically connected to the ground layer 433 via the second connecting portion 440-2 and the conductive via 435.

Figure 5:
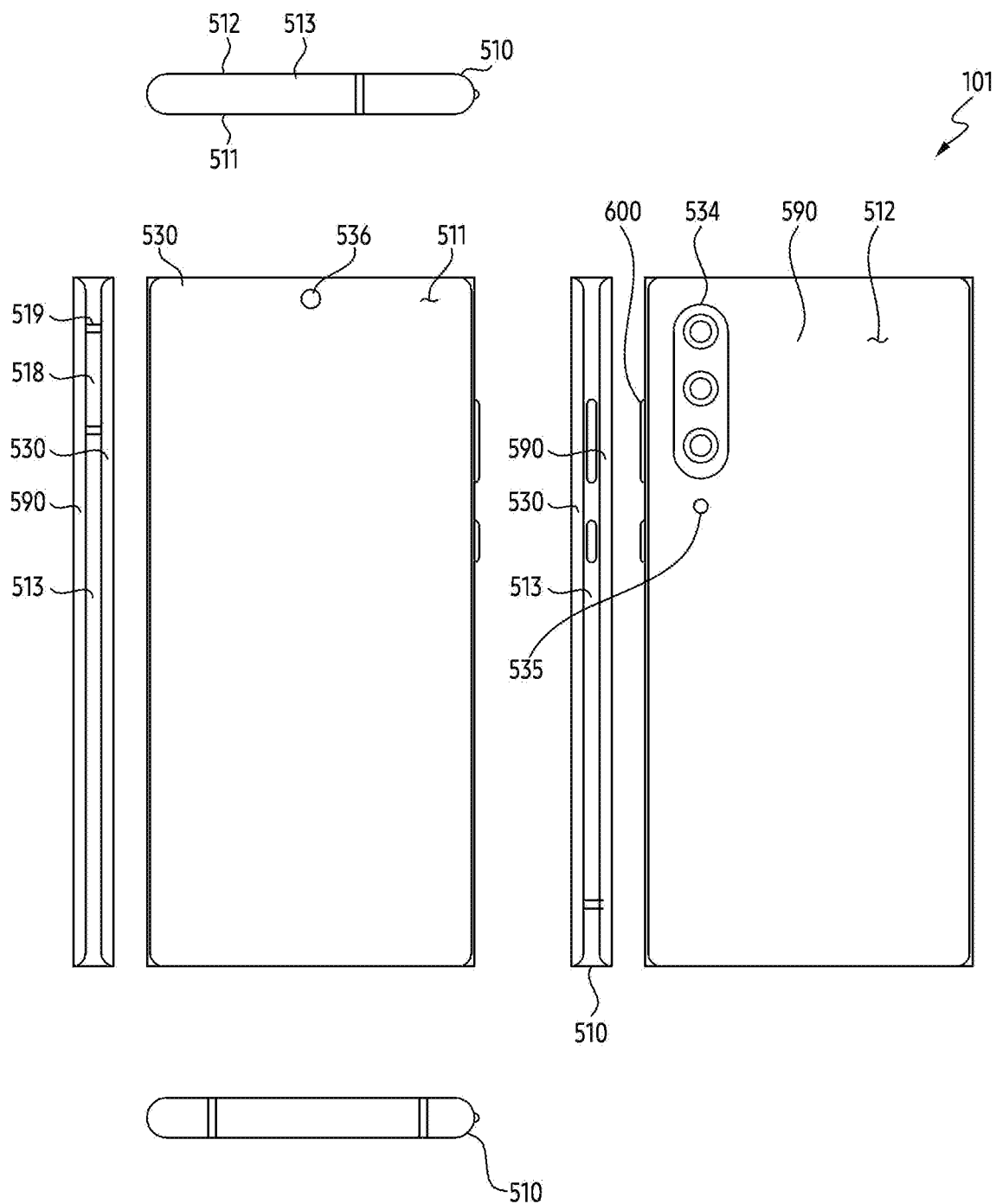
FIG. 5 is a diagram illustrating an appearance of an electronic device according to an embodiment of the disclosure.

FIG. 5 is a diagram illustrating an appearance of an electronic device according to an embodiment of the disclosure.

Referring to FIG. 5, according to an embodiment of the disclosure, the electronic device 101 may include a housing 510 and at least one key button 600.

According to an embodiment of the disclosure, the housing 10 may include a first surface 511 on which a display 530 is disposed and a second surface 512 facing in a direction opposite to the first surface 511. The housing 510 may include a side surface 513 surrounding a space between the first surface 511 and the second surface 512. For example, the first surface 511 and the second surface 512 may be spaced apart from each other, and the side surface 513 may extend along at least a portion of peripheries of the first surface 511 and the second surface 512 between the first surface 511 and the second surface 512, thereby forming an internal space. The housing 510 may refer to a structure forming a portion of the first surface 511, the second surface 512, and the side surface 513 of FIG. 5.

According to an embodiment of the disclosure, the first surface 511 may be formed by a front plate at least a portion of which is substantially transparent. The front plate formed on the first surface 511 may be configured to transmit visual information provided through the display 530 to the outside. The first surface 511 may include a glass plate or a polymer plate including various layers.

According to an embodiment of the disclosure, the second surface 512 may be formed by a substantially opaque cover plate 590. The cover plate 590 may be formed by a combination of at least two of coated or colored glass, ceramic, polymer, or the materials.

According to an embodiment of the disclosure, the housing 10 may provide an internal space defined by the first surface 511, the second surface 512, and the side surface 513, as a mounting space for disposing various components of the electronic device 101. For example, a camera module 534 and an antenna module (e.g., the antenna module 197 of FIG. 1) may be disposed in the internal space. In an embodiment of the disclosure, the side surface 513 may include a conductive material or a non-conductive material. For example, the side surface 513 may include a plurality of conductive portions 518 or non-conductive portions 519, wherein the plurality of conductive portions 518 may be spaced apart from each other. At least one of the non-conductive portions 519 may be interposed between the conductive portions 518.

According to an embodiment of the disclosure, the display 530 may be disposed on the first surface 511 of the housing 510. The display 530 may display visual information thereon. The electronic device 101 may include a front camera module 536 exposed through the first surface 511 on which the display 530 is disposed. A recess or an opening may be formed in a part of a screen display area of the display 530. The electronic device 101 may include a front camera module 536 aligned with the recess or the opening. According to an embodiment of the disclosure, the front camera module 536 may be disposed underneath the display 530 so that at least a portion of the front camera module 536 may be covered by the display 530.

According to an embodiment of the disclosure, at least a portion of and a flash 535 and a rear camera module 534 distinguished from the front camera module 536 may be exposed through an opening formed on the second surface 512. A user of the electronic device 101 may take a picture and/or a video, using the front camera module 536 and the rear camera module 534 included in the electronic device 101. The rear camera module 534 may include cameras having different functions. For example, the rear camera module 534 may include at least one of a depth camera, a wide-angle camera, an ultra-wide-angle camera, or a telephoto camera.

According to an embodiment of the disclosure, the flash 535 may enhance light emitted or reflected from a subject for photographing in a place in low illuminance condition. The flash 535 may direct light toward a subject to enhance light emitted or reflected from the subject, using at least one light emitting diode.

According to an embodiment of the disclosure, at least one key button 600 may be disposed inside the housing 510 to be partially exposed to the side surface 513. For example, at least one key button 600 may be disposed to be partially exposed to the side surface 513 of the electronic device 101 through an opening formed on the side surface 513. When the at least one key button 600 is pressed by a user, the electronic device 101 may perform a designated function in response to pressurization by at least one key button 600. A plurality of key buttons 600 may be provided, and each of the plurality of key buttons may be related to different functions. For example, the electronic device 101 may perform a power on/off function of the electronic device 101, a wake-up/sleep function, or a volume control function of a speaker, in response to pressurization of the at least one key button 600. In an embodiment of the disclosure, the at least one key button 600 may be disposed at a position corresponding to the user's finger, when the user grips the electronic device 101 with one hand. For example, the key button 600 may be disposed on the left and/or right side of the housing 510 so that it may rest in a position corresponding to the user's thumb or index finger.

Figure 6:
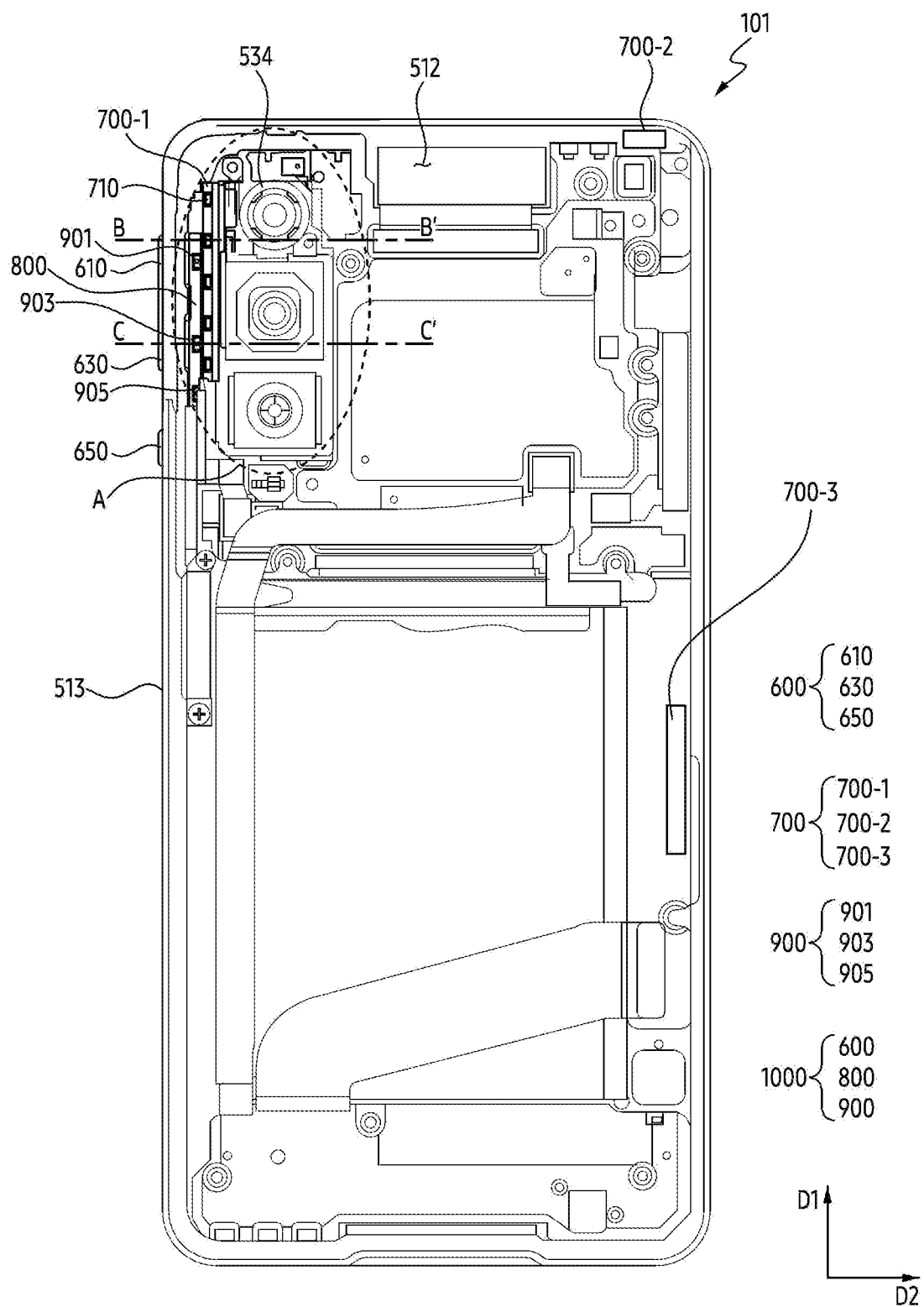
FIG. 6 is a diagram illustrating a second surface in a state in which a cover plate of an electronic device is removed, according to an embodiment of the disclosure.

FIG. 6 is a diagram illustrating a second surface in a state in which a cover plate of an electronic device is removed, according to an embodiment of the disclosure.

Figure 7:
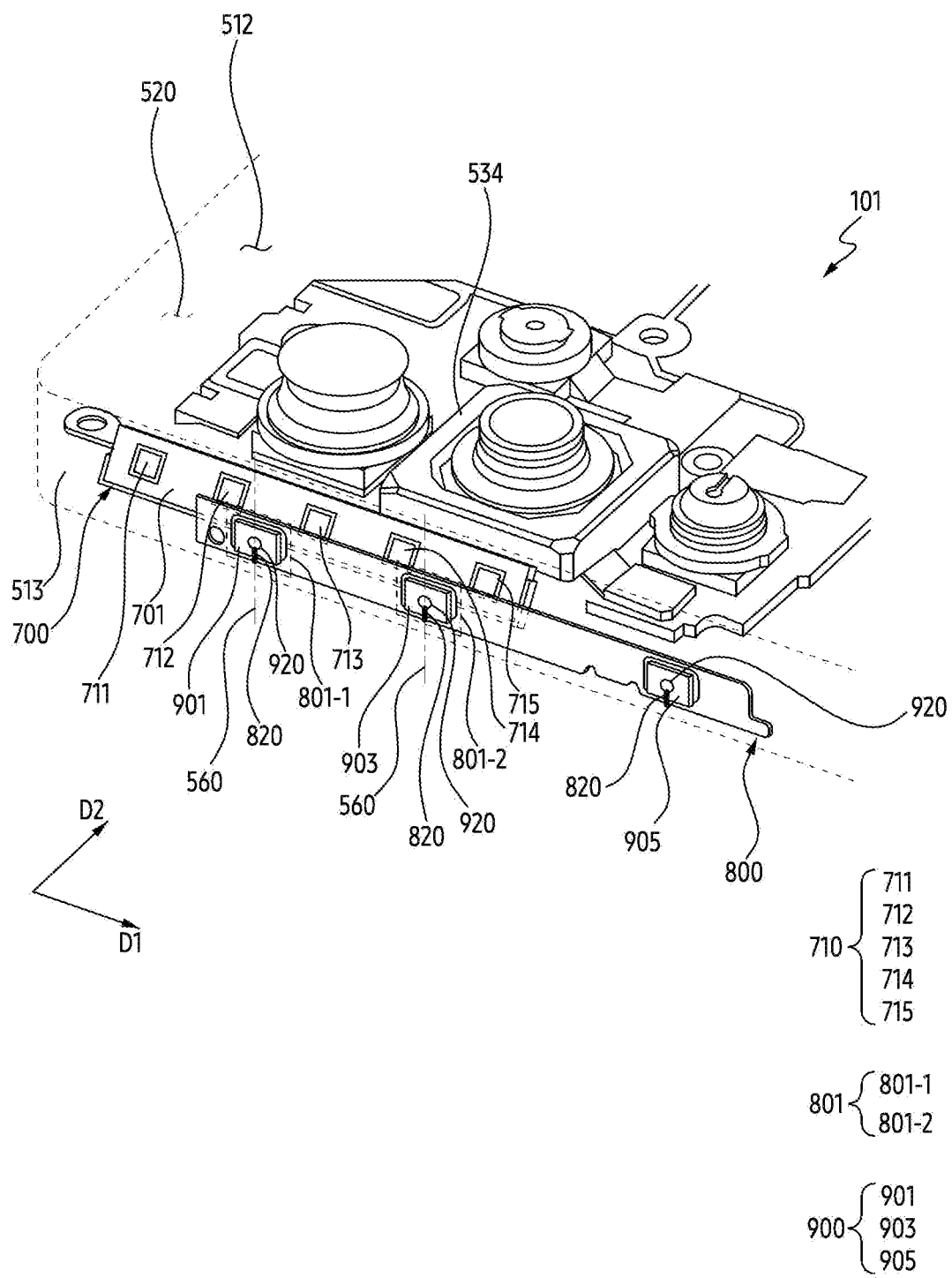
FIG. 7 is a diagram illustrating an enlarged view of a portion A of FIG. 6, according to an embodiment of the disclosure.

FIG. 7 is a diagram illustrating an enlarged view of a portion A of FIG. 6, according to an embodiment of the disclosure.

Referring to FIGS. 6 and 7, the electronic device 101 according to an embodiment may include an antenna module 700 and a key button structure 1000.

According to an embodiment of the disclosure, the antenna module 700 may be disposed in the internal space 520 of the electronic device 101. The antenna module 700 may be disposed adjacent to the side surface 513 to transmit and receive signals to the outside through at least a part of the side surface 513. For example, the antenna module 700 may be disposed between the side surface 513 and the camera module 534. In an embodiment of the disclosure, the antenna module 700 may be disposed closer to the side surface 513 forming the periphery of the housing 510 than an electronic component, such as the camera module 534 disposed in the internal space 520 of the electronic device 101.

According to an embodiment of the disclosure, the antenna module 700 may transmit a signal or power to the outside of the electronic device 101 or receive a signal or power from the outside. The antenna module 700 may be also referred to as the antenna module (e.g., the antenna module 197 of FIG. 1) described above. The antenna module 700 may be used for a 5G network (e.g., the second cellular network 294 of FIG. 2), mmWave communications, 60 GHz communications, or WiGig communications. The electronic device 101 may include a plurality of antenna modules (700-1, 700-2, 700-3). For example, the electronic device 101 may include a first antenna module 700-1, a second antenna module 700-2, and a third antenna module 700-3. The first antenna module 700-1, the second antenna module 700-2, and the third antenna module 700-3 are positioned at different positions in the electronic device 101, and therefore, the coverage of signals radiated from each of the antenna modules (700-1, 700-2, 700-3) may be extended. For example, the first antenna module 700-1 may be disposed between one periphery of the side surface 513 and the camera module 534, the second antenna module 700-2 may be disposed in an area adjacent to another periphery abutting perpendicularly to one periphery of the side surface 513, and the third antenna module 700-3 may be disposed in an area adjacent to another periphery of the side surface 513 facing one periphery of the side surface 513. A plurality of antenna modules (700-1, 700-2, 700-3) may transmit and receive signals of different frequency bands.

Referring to FIG. 7, the antenna module 700 may include a plurality of antenna elements 710. The plurality of antenna elements 710 may be formed on one surface (e.g., one surface 701 of FIG. 7) of the antenna module 700 or adjacent to one surface 701. The plurality of antenna elements 710 may include a first antenna element 711, a second antenna element 712, a third antenna element 713, a fourth antenna element 714, or a fifth antenna element 715 that are spaced apart from each other at regular intervals. The first to fifth antenna elements (711, 712, 713, 714, 715) may be substantially the same type or different types of radiators.

A plurality of antenna elements 710 may form a directional beam. The antenna module 700 may be directed in a travelling direction of a beam formed from the plurality of antenna elements 710. For example, one surface 701 of the antenna module 700 may be inclined with respect to the second surface 512 of the electronic device 101 so that the beam formed by the antenna elements 710 has an acute inclination with respect to the second surface 512. For example, in order for the beam formed by the antenna elements 710 to reduce interference with the conductive portions 518 included in the side surface 513, one surface 701 of the antenna module 700 may be disposed to form an acute angle with respect to the side surface 513.

According to an embodiment of the disclosure, a part of the key button structure 1000 may be located in an internal space (e.g., the internal space 520 of FIG. 7) of the electronic device 101, and the remaining part of the key button structure 1000 may be exposed to the outside of the electronic device 101. For example, the key button structure 1000 may include at least one key button 600, a flexible printed circuit board 800, and a dome 900.

According to an embodiment of the disclosure, the electronic device 101 may include a dome 900 for generating an electrical signal corresponding to the at least one key button 600 depressed, when the at least one key button 600 is depressed. When the at least one key button 600 is depressed, the dome 900 corresponding to the depressed at least one key button 600 is pressurized, thereby generating an electrical signal corresponding to the at least one key button 600.

According to an embodiment of the disclosure, the dome 900 may be spaced apart from at least one key button 600 to the internal space 520. The dome 900 may be spaced apart from the at least one key button 600 in a second direction D2 toward the internal space 520. The dome 900 may be disposed on the flexible printed circuit board 800. For example, the dome 900 may be attached to the flexible printed circuit board 800 with an adhesive tape.

The dome 900 may include a dome switch 920 protruding toward at least one key button 600. The dome 900 may be configured to be spaced apart from the at least one key button 600 located on the side surface 513 toward the internal space 520. The dome 900 may be located at a point corresponding to at least one key button 600. When the user depresses at least one key button 600, the key button 600 may move to the internal space 520, and the dome 900 may be then pressed by the key button 600 moved.

The dome 900 may come into electrical contact with the flexible printed circuit board 800 by manipulation of the key button 600. Depressing the key button 600 may cause a part of the key button 600 to press the dome switch 920, so that the dome switch 920 and the flexible printed circuit board 800 may be in electrical contact. When the dome 900 comes into electrical contact with the flexible printed circuit board 800, an electrical signal may be generated. The electrical signal generated by such an electrical contact may be transmitted to a processor (e.g., the processor 120 of FIG. 1), and the processor may perform a specified operation based on the received signal.

For example, when the user depresses the key button 600 for power on/off of the electronic device 101, the key button 600 for power on/off may move toward the internal space 520, and the dome 900 may be then pressed by contacting a part of the key button 600 moved to the internal space 520.

The electronic device 101 may be configured to generate an electrical signal related to a specified function, by an electrical contact of the dome 900 with a contact pad 820 of the flexible printed circuit board 800. For example, the electronic device 101 may include a first switch 610 for increasing a sound volume of the speaker, a second switch 630 for reducing the volume of the speaker, and a third switch 650 for turning on/off the power of the electronic device 101, and the dome 900 may include a first dome 901, a second dome 903, and a third dome 905, respectively, corresponding to the first switch 610, the second switch 630, and the third switch 650. The first to third switches (610, 630, 650) may be partially exposed though the side surface 513. The first dome 901 may be spaced apart from the first switch 610 in the second direction D2, the second dome 903 may be spaced apart from the second switch 630 in the second direction D2, and the third dome 905 may be spaced apart from the third switch 630 in the second direction D2.

For a specified user input, when at least one key button 600 is depressed, the dome 900 may come into electrical contact with the flexible printed circuit board 800. The flexible printed circuit board 800 may transmit an electrical signal generated by electrical contact with the dome 900 to the processor. The processor may instruct to perform a specified function in response to receiving the signal. For example, in order to turn on/off the power of the electronic device 101, the user may depress a portion exposed to the side surface 513 of the third switch 650, and the third switch 650 may then move toward the internal space 520. The third switch 650 may move toward the internal space 520 by a user's operation to be in contact with the third dome 905. The flexible printed circuit board 800 may transmit an electrical signal for turning power on/off to the processor, in response to the contact of the third switch 650 with the third dome 905.

According to an embodiment of the disclosure, the flexible printed circuit board 800 may be disposed between at least one key button 600 and the antenna module 700. When at least one key button 600 is depressed inward, the dome 900 may be electrically connected to the flexible printed circuit board 800 via at least one key button 600. The flexible printed circuit board 800 may be a printed circuit board in which layers with conductive contact pads 820 printed thereon is printed are stacked. For example, the flexible printed circuit board 800 may include a plurality of layers, a contact pad 820 for electrical contact with the dome 900 may be formed on one surface of the flexible printed circuit board 800, and a ground portion for electrical ground may be included between the plurality of layers.

The contact pad 20 may be electrically connected to the dome 900, as at least one key button 600 is pressed by an external force. For example, when the user depresses at least one key button 600 of the electronic device 101, the dome 900 pressed by the at least one key button 600 may come into electrical contact with the contact pad 820. The flexible printed circuit board 800 may transmit an electrical signal related to the at least one pressed key button 600 to the processor, in response to the contact between the dome 900 and the contact pad 820. The processor 120 may perform processing according to the generated electrical signal. For example, when depressing the key button 600 related to power on/off of the electronic device 101, the processor may receive a signal including a specified request from the flexible printed circuit board 800 and perform a power on/off operation of the electronic device 101 in response to the receiving the signal.

The antenna module 700 may be spaced apart from at least one key button 600 toward the internal space 520. The antenna module 700 may be spaced apart from at least one key button 600 disposed on the side surface 513 in the second direction D2 facing the internal space 520. The antenna module 700 may extend in the first direction D1, and a plurality of antenna elements 710 may be spaced apart from each other at regular intervals along the first direction D1. The antenna module 700 may be disposed alongside at least one key button 600 in the second direction D2 perpendicular to the first direction D1. The antenna module 700 may overlap the key button structure 1000, when viewing the key button structure 1000 in the second direction D2.

The antenna module 700 is spaced apart from at least one key button 600 toward the internal space, and therefore, it may overlap a part of the flexible printed circuit board 800, when the key button structure 1000 is viewed from the second direction D2. For example, the electronic device 101 may have a structure in which the key button structure 1000 and the antenna module 700 are arranged side-by-side with respect to the second direction D2. In an embodiment of the disclosure, the electronic device 101 may have a structure in which the at least one key button 600, the dome 900, the flexible printed circuit board 800, and the antenna module 700 are disposed side-by-side with respect to the second direction D2.

Referring to FIG. 7, the dome 900 may be disposed on an area 801 of the flexible printed circuit board 800, the area corresponding to between each of a plurality of antenna elements 710. The plurality of antenna elements 710 may be spaced apart from each other by a certain distance, and the dome 900 may be located on the area 801 corresponding to an area of the antenna module 700 between the plurality of antenna elements 710. For example, when the key button structure 1000 is viewed in the second direction D2, at least a portion of the dome 900 may not overlap the plurality of antenna elements 710. The dome 900 may be disposed in the area 801 of the flexible printed circuit board 800 corresponding to at least one area among the areas of the antenna module 700 positioned in between each of the plurality of antenna elements 710. The center of the dome 900 may be located between one antenna element (e.g., the second antenna element 712 of FIG. 7) of the plurality of antenna elements 710 and another antenna element (e.g., the third antenna element 713 of FIG. 7) adjacent to the one antenna element (e.g., the second antenna element 712 of FIG. 7). For example, a virtual line (e.g., a virtual line 560 of FIG. 7) that is perpendicular to an extending direction of the side surface 513 and crossing the center of the dome 900 may be positioned between one antenna element of the plurality of antenna elements 710 and another antenna element adjacent to the one antenna. The center of the dome 900 may indicate a position of the dome switch 920.

As the dome 900 may include a conductive material, signals radiated from the plurality of antenna elements 710 may be difficult to be transmitted to the outside. For example, due to the strong straightness of the signals radiated from the plurality of antenna elements 710, distortion of the radiated signals may be caused by the conductive material. In order to reduce the amount of conductive material located in the direction in which the signal is transmitted, the center of the dome 900 may be located between the antenna elements 710, such that the distortion of the signal radiated from the plurality of antenna elements 710 may be reduced.

As the center of the dome 900 is positioned between the antenna elements 710, the influence of the dome 900 including the conductive material on the signals radiated from the plurality of antenna elements 710 may be reduced. For example, the antenna module 700 may include a first antenna element 711, a second antenna element 712, a third antenna element 713, a fourth antenna element 714, and a fifth antenna element 715 that are spaced apart from each other at regular intervals. The first dome 901 may be disposed in an area 801-1 of the flexible printed circuit board 800 corresponding to an area located between the second antenna element 712 and the third antenna element 713, the second dome 903 may be disposed in an area 801-2 of the flexible printed circuit board 800 corresponding to an area located between the fourth antenna element 714 and the fifth antenna element 715, and the third dome 905 may not overlap the antenna module 700.

The electronic device 101 may have a limited mounting space according to the recent trend of miniaturization. At least one key button 600 may be disposed at a position where it is easy for a user to manipulate within the housing 510. The antenna module 700 for transmitting and receiving signals to and from the outside of the electronic device 101 may be disposed to smoothly transmit and receive the signals. When the antenna module 700 is disposed at a position overlapping the key button structure 1000, at least one key button 600, the dome 900, and/or the flexible printed circuit board 800, including a conductive material, may be disposed on a signal transmission/reception path of the plurality of antenna elements 710. The at least one key button 600, the dome 900, and the flexible printed circuit board 800 may affect the signals radiated from the plurality of antenna elements 710, resulting in poor transmission and reception of signals from the electronic device 101. For example, when transmitting and receiving a signal having a millimeter wave (mmWave) band, which is a high frequency band of about 24 GHz or more, the antenna elements 710 may utilize beamforming having high directivity. Beamforming may increase transmission rate and improve communication quality by concentrating and transmitting signals in a specific direction, but it may be difficult to make stable transmission and reception of radio waves due to obstruction caused by obstacles, thereby deteriorating the communication quality. The at least one key button 600, the dome 900, and the flexible printed circuit board 800 that are located in an area corresponding to the antenna module 700 may interfere with the signal transmission and reception of the electronic device 101.

According to an embodiment of the disclosure, when the electronic device 101 is viewed in the second direction D2, the antenna module 700 may overlap the key button structure 1000. In an embodiment of the disclosure, a plurality of antenna modules (700-1, 700-2, 700-3) may be disposed at peripheries of the housing 510, and the plurality of antenna modules (700-1, 700-2, 700-3) may be disposed at a specified position to secure coverage. The antenna modules (700-1, 700-2, 700-3) disposed at the specified position may be disposed to overlap the key button 600, the dome 900, and the flexible printed circuit board 800 forming the key button structure 1000. According to the above-described embodiment of the disclosure, the electronic device 101 may improve radiation performance of the antenna modules by allowing the signals transmitted from the plurality of antenna elements 710 to avoid conductive portions according to the position of the at least one key button 600 and the dome 900. According to an embodiment of the disclosure, the electronic device 101 may include a structure in which the key button structure 1000 overlap the antenna module 700, thereby securing a mounting space and reducing a decrease in transmission/reception performance of signals.

Figure 8:
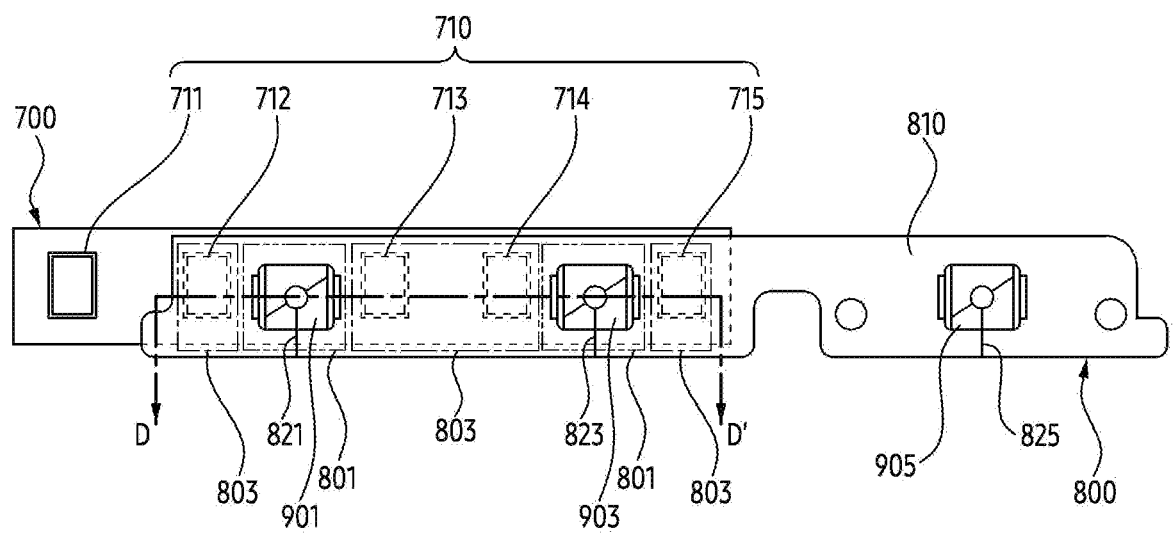
FIG. 8 is a diagram illustrating a structure of a dome, a flexible printed circuit board, and an antenna module of an electronic device, according to an embodiment of the disclosure.
Figure 8:
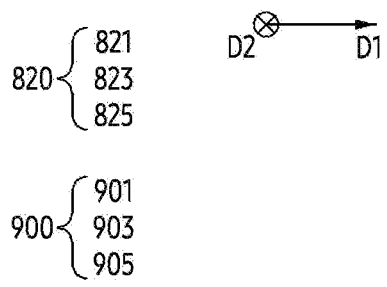

FIG. 8 is a diagram illustrating a structure of a dome, a flexible printed circuit board, and an antenna module of an electronic device, according to an embodiment of the disclosure.

Figure 9:
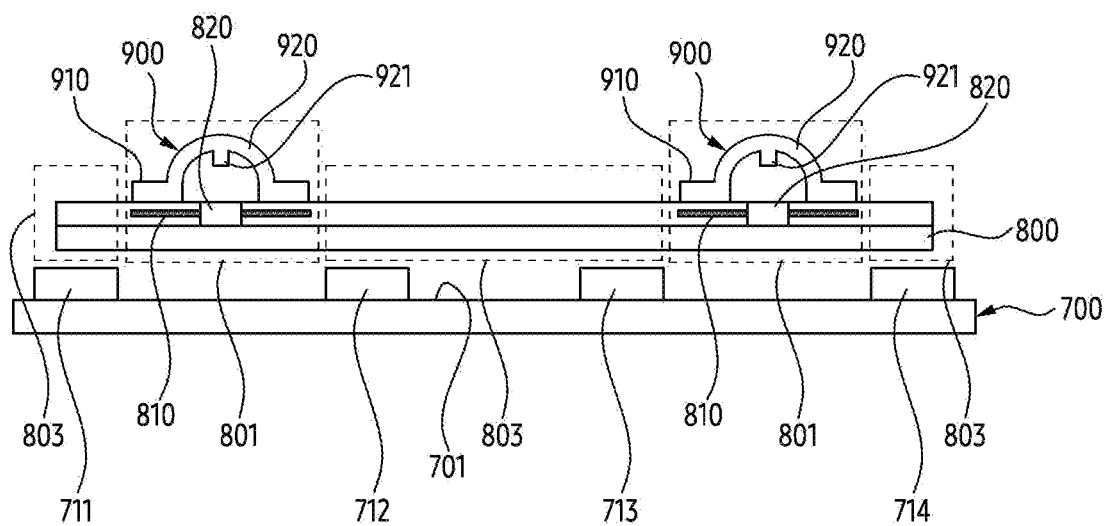
FIG. 9 is a diagram illustrating a cross-sectional view of an electronic device taken along line D-D' of FIG. 8, according to an embodiment of the disclosure.

FIG. 9 is a diagram illustrating a cross-sectional view of an electronic device taken along line D-D' of FIG. 8, according to an embodiment of the disclosure.

Referring to FIGS. 8 and 9, the flexible printed circuit board 800 disposed between the dome 900 and the antenna module 700 may include a ground portion 810 including a conductive material, and a plurality of contact pads 820 electrically connected to the dome 900. When at least one key button (e.g., the at least one key button 600 of FIG. 5) is depressed by the user, the dome 900 may come into electrical contact with the contact pad 820, and a signal corresponding to the depressed key button may be generated in response to the contact. The plurality of contact pads 820 may overlap areas 801 located between each of the plurality of antenna elements 710, respectively.

According to an embodiment of the disclosure, the flexible printed circuit board 800 may include a non-conductive material in a region 803 overlapping the plurality of antenna elements 710. The flexible printed circuit board 800 may include a plurality of conductive layers and a plurality of non-conductive layers each alternately stacked with the conductive layers. The region 803 of the flexible printed circuit board 800 corresponding to the plurality of antenna elements 710 may be removed of a conductive material or a conductive thin film and filled with a non-conductive material, at a position corresponding to each of the plurality of antenna elements 710, such that signals transmitted/received to/from the plurality of antenna elements 710 are transmitted to the outside of the electronic device 101. The aforementioned region 803 may be located in areas corresponding to the plurality of antenna elements 710 on the flexible printed circuit board 800. The contact pad 820 electrically connected to the dome 900 may be spaced apart from each other by the region 803 overlapping the antenna elements 710.

For example, the antenna module 700 may include a first antenna element 711, a second antenna element 712, a third antenna element 713, a fourth antenna element 714, and/or a fifth antenna element 715, which are spaced apart from each other along the first direction D1. The dome 900 may include the first dome 901 located in an area between the second antenna element 712 and the third antenna element 713, a second dome 903 located in an area between the fourth antenna element 714 and the fifth antenna element 715, and/or a third dome 905 spaced apart from the antenna module 700. Each of the first dome 901, the second dome 903, and/or the third dome 905 may be electrically connected to the contact pad 820. For example, the flexible printed circuit board 800 may include a first contact pad 821 electrically connected to the first dome 901, a second contact pad 823 electrically connected to the second dome 903, and/or a third contact pad 825 electrically connected to the third dome 905. The first contact pad 821 may overlap an area located between the second antenna element 712 and the third antenna element 713, and the second contact pad 823 may overlap an area located between the fourth antenna element 714 and the fifth antenna element 715. When viewed in the second direction D2, the flexible printed circuit board 800 may be removed of the conductive material and may be filled with the non-conductive material in the region 803 overlapping the first antenna element 711, the second antenna element 712, the third antenna element 713, the fourth antenna element 714, or the fifth antenna element 715.

According to the above-described embodiment of the disclosure, the flexible printed circuit board 800 includes a non-conductive material in the region 803 facing the first to fifth antenna elements (711, 712, 713, 714, 715), and therefore, the radiation efficiency of the first to fifth antenna elements (711, 712, 713, 714, 715) may be improved.

Referring to FIG. 9, the dome 900 may include a dome switch 920. The dome switch 920 may include a dimple 921 protruding toward the flexible printed circuit board 800 in a central portion thereof. When at least one key button (e.g., the at least one key button 600 of FIG. 5) is depressed by a user, the dome switch 920 is pressed, so that the dimple 921 may come into electrical contact with one contact pad corresponding to the dimple 921 among a plurality of contact pads 820. The electronic device (e.g., the electronic device 101 of FIG. 1) may be configured to generate a specified signal in response to the dimple 921 coming into electrical contact with one of the plurality of contact pads 820.

According to an embodiment of the disclosure, when at least one key button is depressed, the dome switch 920 corresponding to that key button may be pressed. By pressing the dome switch 920, the dimple 921 may be in electrical contact with one of the contact pads 820 of the flexible printed circuit board 800. An electrical signal related to a designated function may be generated by the electrical contact between the dimple 921 and one of the contact pads 820 described above, and the signal may be transmitted to a processor (e.g., the processor 120 of FIG. 1) through the flexible printed circuit board 800. The processor may perform a designated operation based on reception of the electrical signal related to the designated function.

For example, when the user depresses a key button for turning on/off the power of the electronic device, the dome switch 920 corresponding to that key button is pressed, so that the dimple 921 may be in electrical contact with one of the contact pads 820, and in response to the electrical contact, an electrical signal for turning on/off the power may be transmitted to the processor. The processor may turn on/off the power of the electronic device based on receiving of the electrical signal.

The contact pads 820 may be located in the area 801 between each of the plurality of antenna elements 710 on the flexible printed circuit board 800. For example, when the flexible printed circuit board 800 is viewed from above, the contact pads 820 may be disposed between the plurality of antenna elements 710. According to an embodiment of the disclosure, the flexible printed circuit board 800 may include a non-conductive material in the region 803 overlapping the plurality of antenna elements 710. The flexible printed circuit board 800 may include a conductive material in an area corresponding to the dome 900, and the conductive material may be removed from the region 803 overlapping the plurality of antenna elements 710. For example, the region 803 in which the flexible printed circuit board 800 overlaps the plurality of antenna elements 710 may be a fill-cut area in which a portion of a plating layer is removed.

In the electronic device 101 according to an embodiment of the disclosure, when viewed in the second direction D2, the antenna module 700 and a portion of the flexible printed circuit board 800 may overlap each other. The antenna elements 710 may be spaced apart from each other in the first direction D1 on one surface 701 of the antenna module 700. When viewed in the second direction D2, the flexible printed circuit board 800 may include the region 803 overlapping the antenna elements 710, and the area 801 corresponding to between the antenna elements 710. According to an embodiment of the disclosure, the flexible printed circuit board 800 may include a non-conductive material in the region 803 overlapping the plurality of antenna elements 710, thereby reducing the influence of the antenna module 700 on transmission/reception of signals.

Figure 10:
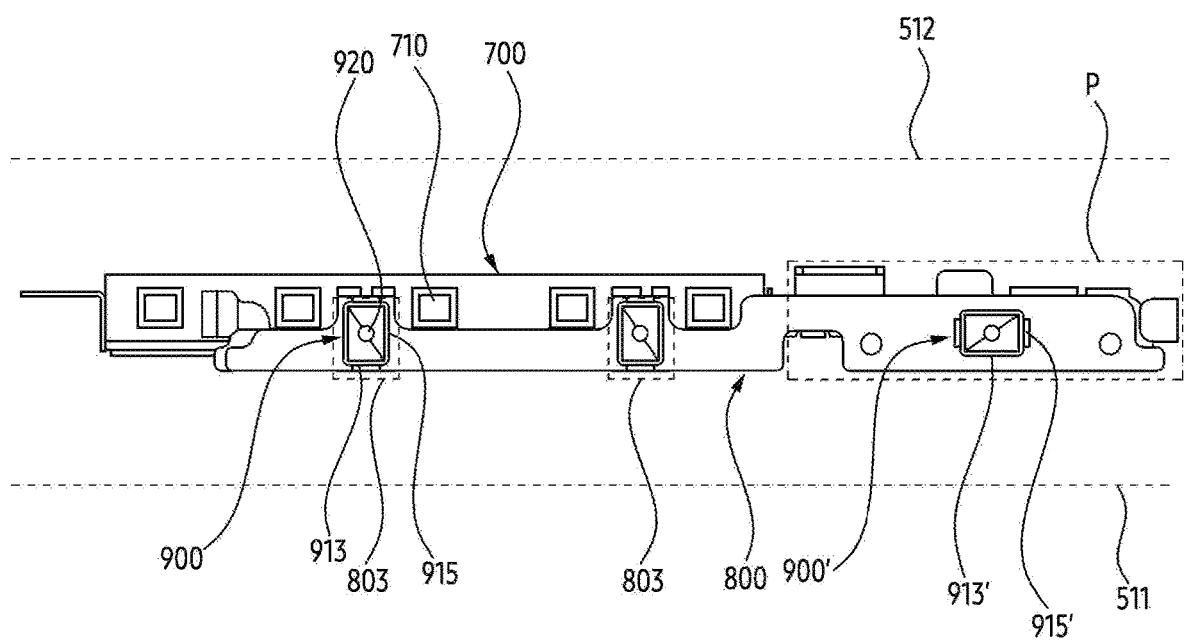
FIG. 10 is a diagram illustrating a structure of a dome, a flexible printed circuit board, and an antenna module of an electronic device, according to an embodiment of the disclosure.

FIG. 10 is a diagram illustrating a structure of a dome, a flexible printed circuit board, and an antenna module of an electronic device, according to an embodiment of the disclosure.

Referring to FIG. 10, an electronic device (e.g., the electronic device 101 of FIG. 1) according to an embodiment may include a structure in which a plurality of antenna elements 710 and a dome 900 do not overlap each other. The dome 900 may be disposed in the region 803 corresponding to between each of the plurality of antenna elements 710 on the flexible printed circuit board 800. The dome 900 may include a first periphery 913 parallel to the first surface 511 and a second periphery 915 perpendicular to the first surface 511. For example, the dome 900 may be a rectangle having the first periphery 913 and the second periphery 915 and may include a dome switch 920 protruding toward at least one key button (e.g., the at least one key button 600 of FIG. 5) at a central portion thereof.

According to an embodiment of the disclosure, the dome 900 may be disposed in various forms depending on the structure of the antenna module 700. When a gap between the plurality of antenna elements 710 is narrow, the dome 900 may have a structure for minimizing an influence on the antenna elements 710 in between the plurality of antenna elements 710. For example, the dome 900 may be a first shape of dome 900 in which the length of the first periphery 913 is less than the length of the second periphery 915. When the gap between the plurality of antenna elements 710 is relatively large, the dome 900 may include a structure for interacting with the at least one key button 600. As another example, the dome 900 may be a second shape of dome 900' in which the length of the first periphery 913' thereof is larger than the length of the second periphery 915'.

According to an embodiment of the disclosure, the flexible printed circuit board 800 may include both a first shape of dome 900 and a second shape of dome 900'. For example, the first shape of dome 900 may be disposed in an area overlapping the antenna module 700, while the second shape of dome 900' may be disposed between the antenna elements 710 of the antenna module 700 or may be disposed in an area P that does not overlap the antenna module 700.

According to an embodiment of the disclosure, the flexible printed circuit board 800 may be formed in the form with a portion of the area 801 corresponding to the antenna elements 710 being removed. For example, the area 801 corresponding to the antenna elements 710 on the flexible printed circuit board 800 may be recessed toward the first surface 511, so that the antenna elements 710 may be exposed when viewed in the second direction D2. According to an embodiment of the disclosure, the flexible printed circuit interference with signal transmission/reception of the antenna module 700.

According to an embodiment of the disclosure, when the electronic device 101 is viewed from the side surface 513, the dome 900 including the conductive material may be disposed not to overlap the antenna elements 710, and thus, the electronic device 101 may transmit signals from the antenna elements 710 to the outside without any loss of signals.

Figure 11:
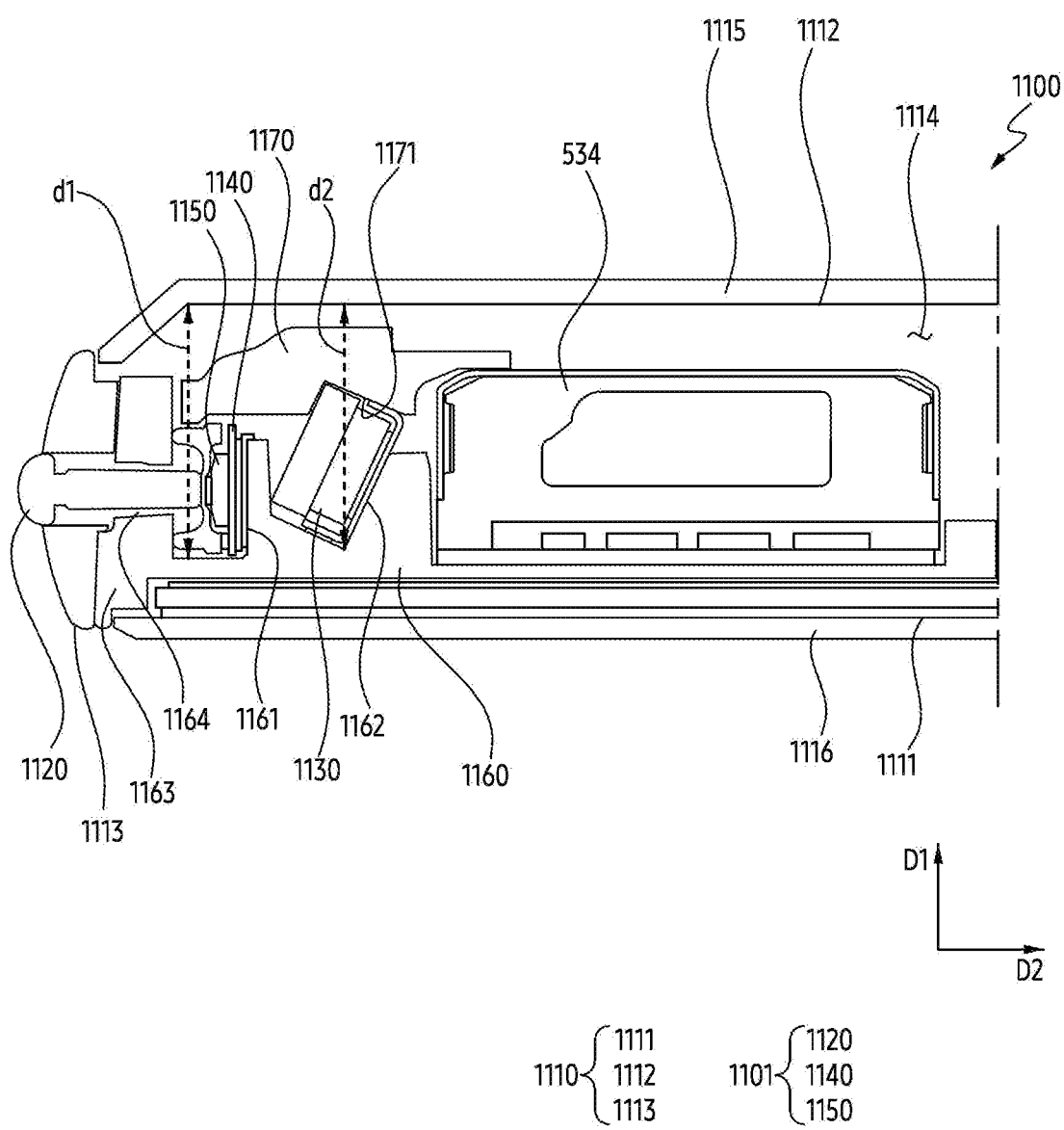
FIG. 11 is a diagram illustrating a cross-sectional view of a space between a plurality of antenna elements, taken along line B-B' of FIG. 6, of an electronic device, according to an embodiment of the disclosure.

FIG. 11 is a diagram illustrating a cross-sectional view of a space between a plurality of antenna elements, taken along line B-B' of FIG. 6, of an electronic device, according to an embodiment of the disclosure.

Figure 12:
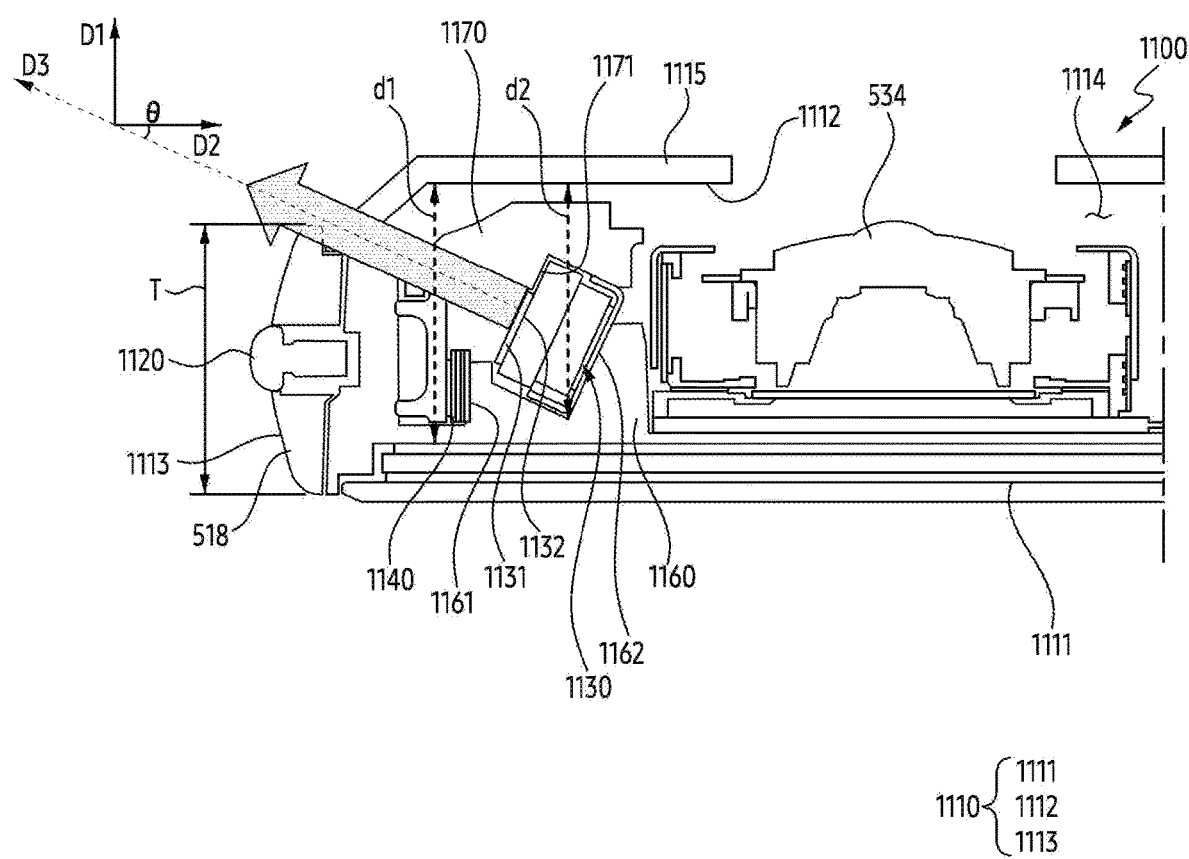
FIG. 12 is a diagram illustrating a cross-sectional view of an electronic device including one of a plurality of antenna elements, taken along line C-C' of FIG. 6, according to an embodiment of the disclosure.

FIG. 12 is a diagram illustrating a cross-sectional view of an electronic device including one of a plurality of antenna elements, taken along line C-C' of FIG. 6, according to an embodiment of the disclosure.

At least one of components of an electronic device 1100 according to an embodiment may be substantially the same as or similar to at least one of the components of the electronic device 101 of FIGS. 5 to 7, and thus, any redundant descriptions will be omitted for conciseness of the description.

Referring to FIGS. 11 and 12, the electronic device 1100 (e.g., the electronic device 101 of FIG. 5) according to an embodiment may include a housing 1110 (e.g., the housing 510 of FIG. 5) including a first surface 1111 (e.g., the first surface 511 of FIG. 5), a second surface 1112 (e.g., the second surface 512 of FIG. 5) facing the first surface 1111, and a side surface 1113 (e.g., the side surface 513 of FIG. 5) disposed between the first surface 1111 and the second surface 1112, a key button structure 1101 (e.g., the key button structure 1000 of FIG. 6) partially exposed to the side surface 1113, and an antenna module 1130 (e.g., the antenna module 700 of FIG. 6) including a plurality of antenna elements 1131 (e.g., the antenna elements 710 of FIG. 6). The key button structure 1101 may include at least one key button 1120 (e.g., the at least one key button 600 of FIG. 5), a flexible printed circuit board 1140 (e.g., the flexible printed circuit board 800 of FIG. 6) disposed between the side surface 1113 and the antenna module 1130, and a dome 1150 or 1151 (e.g., the dome 900 of FIG. 6) coming into electrical contact with the flexible printed circuit board 1140 by an external force. In the electronic device 1100, the key button structure 1101 and the antenna module 1130 may overlap each other, when viewed in the second direction D2.

According to an embodiment of the disclosure, the antenna module 1130 may be spaced apart from the side surface 1113 toward an internal space 1114. The dome 1150 and the flexible printed circuit board 1140 may be disposed between the side surface 1113 and the antenna module 1130. When the electronic device 1100 is viewed in the second direction D2, the key button structure 1101 and the antenna module 1130 may be arranged to overlap each other.

According to an embodiment of the disclosure, the area of the flexible printed circuit board 1140 that overlaps the plurality of antenna elements 1131 may be removed of the conductive thin film from a position corresponding to the plurality of antenna elements 1131 and may be filled with a non-conductive material, so as to transmit a signal from the plurality of antenna elements 1131 to the outside.

According to an embodiment of the disclosure, the side surface 1113 may include a conductive material. For example, the side surface 1113 may include conductive portions 518, such as e.g., stainless steel or aluminum. The side surface 1113 including the conductive portions 518 may protect the electronic device 1100 from mechanical or chemical damage. The conductive material included in the side surface 1113 may affect radio waves of signals transmitted and received to and from the antenna module 1130. According to an embodiment of the disclosure, a cover plate 1115 (e.g., the cover plate 590 of FIG. 5) may include a non-conductive material. For example, the cover plate 1115 may include coated or colored glass, ceramic, or polymer.

When the side surface 1113 is positioned on the signal transmission/reception path of the plurality of antenna elements 1131, the signal radiated from the plurality of antenna elements 1131 may be subject to distortion owing to the conductive material included in the side surface 1113. The side surface 1113 including the conductive material may affect electromagnetic waves, thereby resulting in deteriorated communication efficiency of the electronic device 1100. Referring to FIG. 12, the antenna module 1130 according to an embodiment may be disposed to be inclined with respect to the side surface 1113 and the second surface 1112 within the internal space 1114 to transmit and receive signals in the third direction D3 between the first direction D1 and the second direction D2. According to an embodiment of the disclosure, one surface 1132 of the antenna module 1130 may be formed to face the third direction D3 to form a beam toward the third direction D3. The antenna module 1130 may have an inclination to form an acute angle toward the side surface 1113 and the second surface 1112. In an embodiment of the disclosure, the antenna module 1130 may be disposed to face between the cover plate 1115 and the side surface 1113. The plurality of antenna elements 1131 disposed on one surface 1132 of the antenna module 1130 may form a beam toward the side surface 1113 and the second surface 1112 toward which the antenna module 1130 faces.

According to an embodiment of the disclosure, the antenna module 1130 may transmit a signal emitted from the plurality of antenna elements 1131 to the outside of the electronic device 1100 through a space between the cover plate 1115 and the side surface 1113. The plurality of antenna elements 1131 may form a beam between the cover plate 1115 and the side surface 1113. For example, the antenna module 1130 may be arranged such that an angle (θ) formed in between the second direction D2 and the third direction D3 toward which one surface 1132 of the antenna module 1130 faces forms a specified angle. The specified angle may be adjusted according to a thickness of the side surface 1113, a position of the point where the side surface 1113 and the cover plate 1115 come into contact with each other, or a position of the antenna module 1130. For example, the specified angle may increase as the thickness T of the conductive portion 518 included in the side surface 1113 becomes greater, and may decrease as the thickness T of the conductive portion 518 becomes less.

According to the above-described embodiment of the disclosure, the beam formed by the antenna module 1130 may be directed to between the cover plate 1115 disposed on the second surface 1112 and the side surface 1113, thereby allowing smooth transmission and reception of signals. The antenna module 1130 may be inclined toward the cover plate 1115 including a non-conductive material, thereby improving the radiation performance of the plurality of antenna elements 1131. For example, the antenna module 1130 may face between the cover plate 1115 and the side surface 1113, and the plurality of antenna elements 1131 may transmit a signal to the outside of the electronic device 1100 by transmitting the signal toward between the cover plate 1115 and the side surface 1113. The electronic device 1100 may secure rigidity of the electronic device 1100 through the side surface 1113 including a conductive material, and may improve the performance of signal transmission/reception through the arrangement of the antenna module 1130 disposed toward between the cover plate 1115 and the side surface 1113.

According to an embodiment of the disclosure, the housing 510 may include a first supporting member 1160 supporting at least one key button 1120, a flexible printed circuit board 1140, and/or the antenna module 1130. For example, the first supporting member 1160 may be connected to the side surface 1113 to be disposed within the internal space 1114. For example, the first supporting member 1160 may extend from the side surface 1113 to the internal space 1114 to be integrally formed with the side surface 1113. The at least one key button 1120, the flexible printed circuit board 1140, and the antenna module 1130 may be arranged on the first supporting member 1160. For example, the first supporting member 1160 may include a partition wall 1163 in contact with the side surface 1113. The partition wall 1163 may include an opening 1164 into which a portion of the key button 1120 is inserted. The first supporting member 1160 may further include a first seating surface 1161 on which the flexible printed circuit board 1140 is seated and a second seating surface 1162 on which the antenna module 1130 is seated. The opening 1164 may enclose the key button 1120 so as to guide the key button 1120 to move to the internal space 1114 when the key button 1120 is depressed by the user.

According to an embodiment of the disclosure, the first supporting member 1160 may include a first seating surface 1161 configured to support the flexible printed circuit board 1140 and a second seating surface 1162 configured to support the antenna module 1130. The flexible printed circuit board 1140 may be disposed on the first seating surface 1161, and the antenna module 1130 may be disposed on the second seating surface 1162.

The first seating surface 1161 may be configured to be parallel to the second surface 1112. The first seating surface 1161 may be spaced apart from the key button 1120 toward the internal space 1114. The first seating surface 1161 may be formed such that the flexible printed circuit board 1140 disposed on the first seating surface 1161 faces the key button 1120, thereby supporting the dome 1150 and the flexible printed circuit board 1140. For example, the first seating surface 1161 may support the flexible printed circuit board 1140 such that the dome 1150 and the flexible printed circuit board 1140 are not pushed away into the internal space 1114, when the key button 1120 presses the dome 1150.

The second seating surface 1162 may have a certain inclination with respect to the second surface 1112. The inclination of the second seating surface 1162 may be formed as an inclination with which the antenna module 1130 disposed on the second seating surface 1162 faces between the cover plate 1115 and the side surface 1113. For example, since the second seating surface 1162 has an inclination toward the space between the cover plate 1115 and the side surface 1113, the antenna module 1130 disposed on the second seating surface 1162 may form a beam toward the space between the cover plate 1115 and the side surface 1113. For example, the second seating surface 1162 has an inclination toward the third direction D3, and therefore, one surface 1132 of the antenna module 1130 disposed on the second seating surface 1162 may face the third direction D3.

According to an embodiment of the disclosure, the antenna module 1130 may be located closer to the second surface 1112 than the flexible printed circuit board 1140. A distance d1 between the first seating surface 1161 and the second surface 1112 may be formed to be greater than a distance d2 between the second surface 1112 and a point farthest from the second surface of the second seating surface 1162. For example, when the first seating surface 1161 is more adjacent to a point where the side surface 1113 and the cover plate 1115 come into contact with each other than the second seating surface 1162, the antenna module 1130 may be located above the flexible printed circuit board 1140 with respect to the first direction D1. The plurality of antenna elements 1131 may be positioned closer to the second surface 1112 than the flexible printed circuit board 1140, thereby securing a radiation space for transmitting and receiving signals.

According to an embodiment of the disclosure, the electronic device 1100 may include a first supporting member 1160 configured to support the flexible printed circuit board 1140 and the antenna module 1130, and a second supporting member 1170 configured to support the cover plate 1115. The first seating surface 1161 and the second seating surface 1162 described above may be included in the first supporting member 1160.

The antenna module 1130 may be supported by the first supporting member 1160 and the second supporting member 1170. A portion of the antenna module 1130 facing the first surface 1111 may come into contact with the first supporting member 1160, and a portion of the antenna module 1130 facing the second surface 1112 may come into contact with the second supporting member 1170. When the antenna module 1130 is located closer to the second surface 1112 than the flexible printed circuit board 1140, the second supporting member 1170 may include a recess 1171 in a position in contact with the antenna module 1130. The recess 1171 may accommodate a portion of the antenna module 1130 facing the second supporting member 1170. Since the distance d1 between the first seating surface 1161 and the second surface 1112 may be formed to be larger than the distance d2 between the second surface 1112 and the point farthest from the second surface 1112 of the second seating surface 1162, the recess 1171 of the second supporting member 1170 may be formed in a portion of the second supporting member 1170, which portion comes into contact with a portion of the antenna module 1130 facing the second surface 1112. The recess 1171 formed to correspond to the shape of the portion facing the second surface 1112 of the antenna module 1130 may rigidly support the antenna module 1130.

Figure 13:
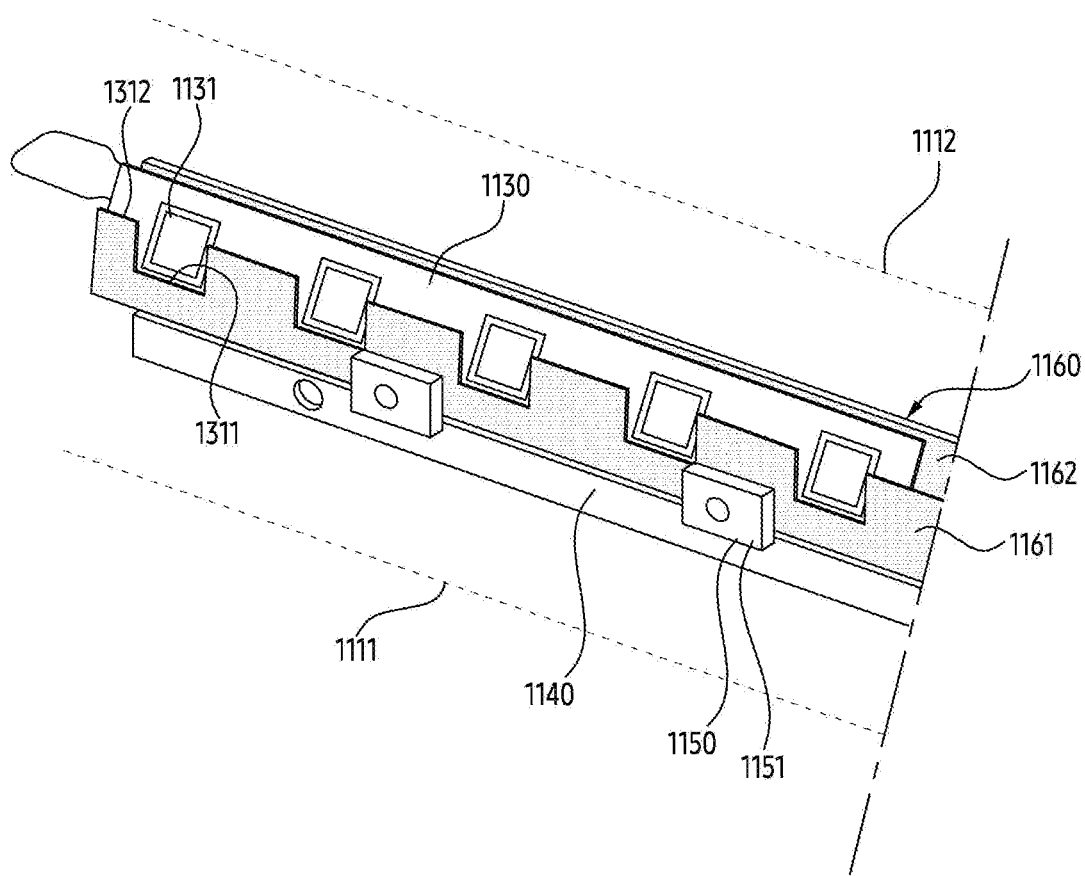
FIG. 13 is a diagram illustrating a supporting member supporting a flexible printed circuit board and an antenna module of an electronic device, according to an embodiment of the disclosure.

FIG. 13 is a diagram illustrating a supporting member supporting a flexible printed circuit board and an antenna module of an electronic device, according to an embodiment of the disclosure.

Referring to FIG. 13, the supporting member 1160 according to an embodiment may include a plurality of grooves 1311 and a plurality of protrusions 1312. The plurality of protrusions 1312 and the plurality of grooves 1311 may be formed to correspond to positions of the plurality of antenna elements 1131.

According to an embodiment of the disclosure, the supporting member 1160 may include a plurality of grooves 1311 so as not to interfere with signal transmission/reception on a path through which the plurality of antenna elements 1131 transmit/receive signals. The plurality of grooves 1311 may be formed in areas corresponding to the plurality of antenna elements 1131. When at least one key button (e.g., the at least one key button 1120 of FIG. 11) is viewed vertically, the plurality of grooves 1311 may be recessed toward the first surface 1111 in the areas overlapping the plurality of antenna elements 1131. For example, the supporting member 1160 may form the plurality of grooves 1311 recessed toward the first surface 1111 in the areas corresponding to the plurality of antenna elements 1131, such that no conductive material exists on a transmission path of a signal emitted from the plurality of antenna elements 1131.

The plurality of antenna elements 1131 may be spaced apart from each other at substantially the same interval, and the plurality of grooves 1311 may be also spaced apart from each other at substantially the same interval as the above interval.

According to an embodiment of the disclosure, the supporting member 1160 may include a plurality of protrusions 1312 to support a portion of the flexible printed circuit board 1140 and the dome 1150. At least one of the plurality of protrusions 1312 may support the dome 1150 and the flexible printed circuit board 1140. The portion of the flexible printed circuit board 1140 may correspond to an area in which the dome 1150 is disposed. The plurality of protrusions 1312 may be formed in areas that do not correspond to the plurality of antenna elements 1131. The plurality of protrusions 1312 may be formed to protrude toward the second surface 1112 in the areas corresponding to between each of the plurality of antenna elements 1131, when at least one key button is viewed vertically. For example, the plurality of protrusions 1312 may protrude toward the second surface 1112 in the areas overlapping each of the areas located between each of the plurality of antenna elements 1131 so as to support the dome 1150 disposed in the corresponding area between the plurality of antenna elements 1131. In an embodiment of the disclosure, when the dome 1150 is pressed by the key button, the plurality of protrusions 1312 may support the dome 1150 within the internal space 1114, thereby preventing the dome 1150 from being pushed away toward the internal space 1114 and providing a clicking feeling to the user.

Figure 14:
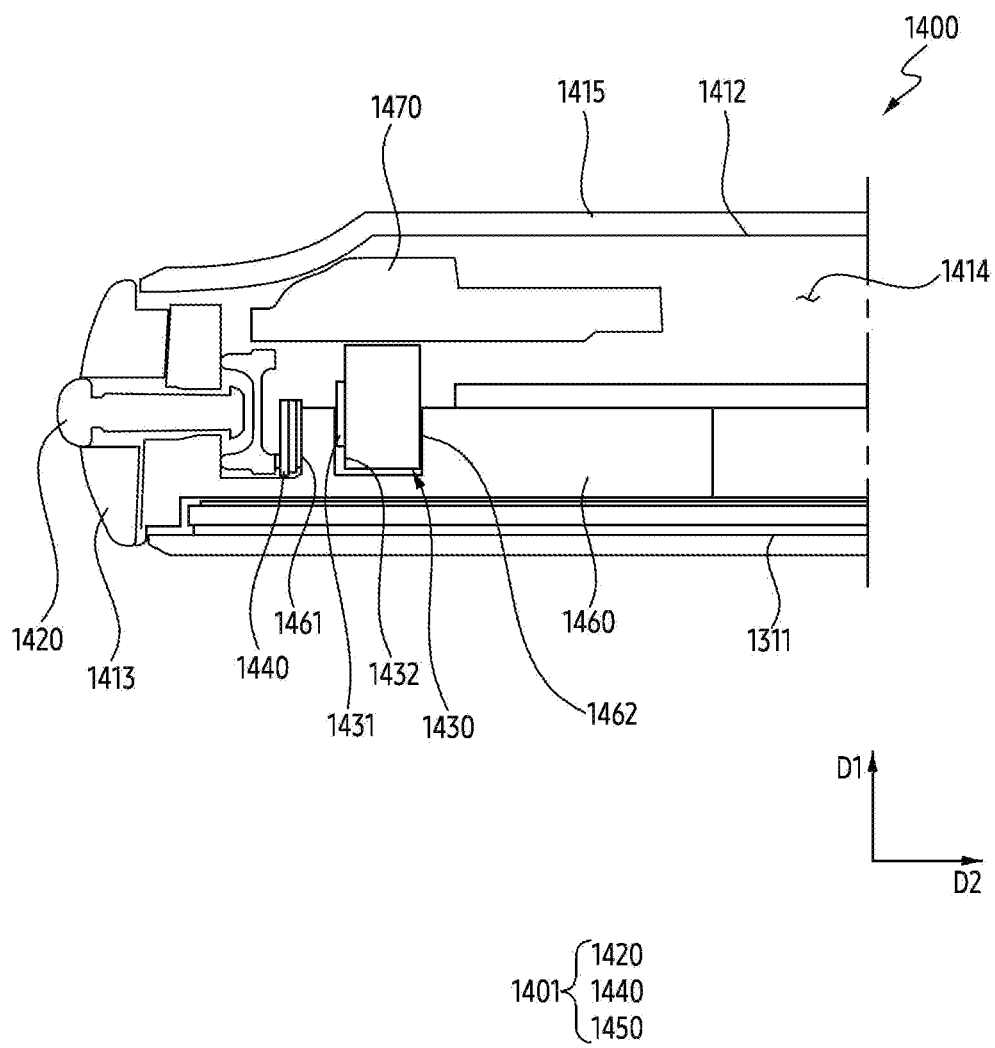
FIG. 14 is a diagram illustrating a cross-sectional view of an example in which a first supporting member is deformed in an electronic device, according to an embodiment of the disclosure.

FIG. 14 is a cross-sectional view illustrating an example in which a first supporting member is deformed in an electronic device, according to an embodiment of the disclosure.

According to an embodiment of the disclosure, at least one of the components of an electronic device 1400 may be the same as or similar to at least one of the components of the electronic device 101 of FIGS. 5 to 7, and their redundant descriptions will be omitted for the conciseness of the description.

Referring to FIG. 14, according to an embodiment of the disclosure, an electronic device 1400 (e.g., the electronic device 101 of FIG. 5) may comprise a housing 1410 (e.g., the housing 510 of FIG. 5) including a first surface 1414 (e.g., the first surface 511 of FIG. 5), a second surface 1412 (e.g., the second surface 512 of FIG. 5) facing the first surface 1414, and a side surface 1413 (e.g., the side surface 513 of FIG. 5) disposed between the first surface 1414 and the second surface 1412, a key button structure 1401 partially exposed to the side surface 1413, and an antenna module 1430 (e.g., the antenna module 700 of FIG. 6) including a plurality of antenna elements 1431 (e.g., the antenna elements 710 of FIG. 6). The key button structure 1401 may include at least one key button 1420 (e.g., the at least one key button 600 of FIG. 5), a flexible printed circuit board 1440 (e.g., the flexible printed circuit board 800 of FIG. 6) disposed between the side surface 1413 and the antenna module 1430, and a dome 1450 (e.g., the dome 900 of FIG. 6) brought into electrical contact with the flexible printed circuit board 1440 by an external force. In the electronic device 1400, when viewed in the second direction D2, the key button structure 1401 and the antenna module 1430 may overlap each other. The housing 1410 may include a first supporting member 1460 and a second supporting member 1470. The first supporting member 1460 may include a first seating surface 1461 supporting the flexible printed circuit board 1440 and a second seating surface 1462 supporting the antenna module 1430.

According to an embodiment of the disclosure, the side surface 1413 may include a non-conductive material. For example, the side surface 1413 may include a plastic material. The side surface 1413 including the non-conductive material may be formed by injection molding. A portion of the side surface 1413 may be formed of a non-conductive material, and another portion of the side surface 1413 may be formed of a conductive material. The antenna module 1430 may be disposed to form a beam toward the side surface 1413 including the non-conductive material. In an embodiment of the disclosure, the antenna module 1430 may be arranged to face a direction in which the beam formed from the plurality of antenna elements 1431 is to be directed. For example, the antenna module 1430 may be disposed parallel to the side surface 1413 such that the beam formed in the antenna elements 1431 faces the side surface 1413. For example, one surface 1432 of the antenna module 1430 may be disposed to form a beam toward the side surface 1413. One surface 1432 of the antenna module 1430 may be disposed parallel to the key button structure 1401, facing the second direction D2.

The plurality of antenna elements 1431 facing the side surface 1413 may transmit signals to the outside of the electronic device 1400 through the side surface 1413 and may receive signals from the outside of the electronic device 1400 through the side surface 1413. As the side surface 1413 includes a non-conductive material, interference with signals transmitted and received through the side surface 1413 may be reduced. The flexible printed circuit board 1440 may include a non-conductive material in the areas overlapping the plurality of antenna elements 1431.

According to the above-described embodiment of the disclosure, the side surface 1413 includes a non-conductive material, and therefore, the plurality of antenna elements 1431 may transmit and receive signals through the side surface 1413. The second seating surface 1462 supporting the antenna module 1430 may face the side surface 1413, without having to be inclined toward a portion between a cover plate 1415 and the side surface 1413. The first seating surface 1461 and the second seating surface 1462 may be parallel to the second surface 1412. According to an embodiment of the disclosure, the electronic device 1400 may transmit and receive signals through the side surface 1413, and thus its design can be simplified.

According to an embodiment of the disclosure, an electronic device (e.g., the electronic device 101 of FIG. 5) may comprise a housing (e.g., the housing 510 of FIG. 5) including a first surface (e.g., the first surface 511 of FIG. 5) on which a display (e.g., the display 530 of FIG. 5) is disposed, a second surface (e.g., the second surface 512 of FIG. 5) facing opposite to the first surface, and a side surface (e.g., the side surface 513 of FIG. 5) surrounding a space between the first surface and the second surface to form an internal space (e.g., the internal space 520 of FIG. 7), a key button structure (e.g., the key button structure 1000 of FIG. 5) within the housing, partially exposed to the side surface, and an antenna module (e.g., the antenna module 700 of FIG. 7) spaced apart from the key button structure toward the internal space and including a plurality of antenna elements (e.g., the antenna elements 710 of FIG. 7), wherein the key button structure may comprise at least one key button (e.g., the at least one key button 600 of FIG. 5) that is partially exposed to the side surface and movable into the internal space when pressed, a flexible printed circuit board (e.g., the flexible printed circuit board 800 of FIG. 7) including a ground portion (e.g., the ground portion 810 of FIG. 7) and disposed in between the at least one key button and the antenna module, and a dome (e.g., the dome 900 of FIG. 7) pressed by the at least one key button as the at least one key button moves into the internal space, electrically connected to the flexible printed circuit board, and disposed on a region (e.g., the region 801 of FIG. 7) of the flexible printed circuit board corresponding to at least one region among regions of the antenna module located between each of the plurality of antenna elements, and wherein when the at least one key button structure is viewed vertically, the antenna module may overlap a portion of the flexible printed circuit board.

According to an embodiment of the disclosure, the flexible printed circuit board may comprise a plurality of contact pads (e.g., the contact pad 820 of FIG. 8) overlapping each of the regions of the antenna module located between each of the plurality of antenna elements, when the key button structure is viewed perpendicularly.

According to an embodiment of the disclosure, the flexible printed circuit board may include a non-conductive material in regions (e.g., the region 803 of FIG. 8) overlapping with the plurality of antenna elements to space the plurality of contact pads apart.

According to an embodiment of the disclosure, when the electronic device is viewed from a side surface, the regions of the flexible printed circuit board overlapping with the plurality of antenna elements may be fill-cut region.

According to an embodiment of the disclosure, the electronic device may further comprise a cover plate (e.g., the cover plate 590 of FIG. 5) disposed on the second surface, and the antenna module may be directed to between the cover plate and the side surface to transmit a signal emitted from the plurality of antenna elements to an outside of the electronic device.

According to an embodiment of the disclosure, the cover plate may comprise a non-conductive material, and the side surface comprises a conductive material.

According to an embodiment of the disclosure, the housing may comprise a supporting member (e.g., the first supporting member 1160 of FIG. 11) configured to support the at least one key button, the flexible printed circuit board, and the antenna module, and the supporting member may comprise a first seating surface (e.g., the first seating surface 1161 of FIG. 11) supporting the flexible printed circuit board and a second seating surface (e.g., the second seating surface 1162 of FIG. 11) supporting the antenna module.

According to an embodiment of the disclosure, the first seating surface be configured to be parallel to the second surface, and the second seating surface be inclined with respect to the second surface.

According to an embodiment of the disclosure, a distance (e.g., the distance d1 of FIG. 11) between the first seating surface and the second surface may be longer than a distance (e.g., the distance d2 of FIG. 11) between the second surface and a point of the second seating surfaces farthest from the second surface.

According to an embodiment of the disclosure, when the key button structure is viewed perpendicularly, the supporting member may comprise a plurality of grooves (e.g., the grooves 1311 of FIG. 13) recessed toward the first surface in regions overlapping with the plurality of antenna elements, and a plurality of protrusions (e.g., the protrusions 1312 of FIG. 13) protruding toward the second surface in regions overlapping with each of the regions located between each of the plurality of antenna elements.

According to an embodiment of the disclosure, at least one of the plurality of protrusions may support the dome.

According to an embodiment of the disclosure, the side surface may comprise a non-conductive material, and one surface (e.g., the one surface 701 of FIG. 7) of the antenna module on which the antenna elements are disposed may be substantially parallel to the side surface.

According to an embodiment of the disclosure, the housing may comprise a supporting member to configured to support the at least one key button, the flexible printed circuit board, and the antenna module, and the supporting member includes a first seating surface supporting the flexible printed circuit board and a second seating surface supporting the antenna module.

According to an embodiment of the disclosure, when the key button structure is viewed perpendicularly, the supporting member may comprise a plurality of grooves recessed toward the first surface in regions overlapping with the plurality of antenna elements, and a plurality of protrusions protruding toward the second surface in regions overlapping with each of the regions located between each of the plurality of antenna elements.

According to an embodiment of the disclosure, a center of the dome may be located in between one antenna element among the plurality of antenna elements and another antenna element adjacent to the one antenna element.

According to an embodiment of the disclosure, the dome may comprise a first periphery (e.g., the first periphery 913 of FIG. 10) parallel to the first surface, and a second periphery (e.g., the first periphery 915 of FIG. 10) in contact with the first periphery and perpendicular to the first surface, and a length of the first periphery is less than a length of the second periphery.

According to an embodiment of the disclosure, an electronic device (the electronic device 1100 of FIG. 11) may comprises: a display (e.g., a display 1116 of FIG. 11); a cover plate (e.g., the cover plate 1115 of FIG. 11) opposite to the display; a housing (e.g., the housing 1110 of FIG. 11) including a first surface (e.g., the first surface 1111 of FIG. 11) on which the display is disposed, a second surface (e.g., the second surface 1112 of FIG. 11) on which the cover plate is disposed, and a side surface (e.g., the side surface 1113 of FIG. 11) disposed between the first surface and the second surface; an antenna module (e.g., the antenna module 1130 of FIG. 11) in the housing, including a plurality of antenna elements (e.g., the antenna elements 1131 of FIG. 12); a flexible printed circuit board (e.g., the flexible printed circuit board 1140 of FIG. 11) disposed between the side surface and the antenna module and comprising a conductive thin film; and a dome (e.g., the dome 1150 of FIG. 13) electrically connected to the conductive thin film by an external force and disposed on a region of the flexible printed circuit board, the region of the flexible printed circuit board corresponding to at least one region among regions of the antenna module located between each of the plurality of antenna elements, wherein the antenna module may be directed to between the cover plate and the side surface to transmit signals emitted from the plurality of antenna elements to an outside of the electronic device.

According to an embodiment of the disclosure, the cover plate may comprise a non-conductive material and the side surface may comprise a conductive material.

According to an embodiment of the disclosure, the housing may comprise a first supporting member (e.g., the first supporting member 1160 of FIG. 11) configured to support the flexible printed circuit board and the antenna module, wherein the first supporting member includes a first seating surface (e.g., the first seating surface 1161) supporting the flexible printed circuit board and a second seating surface (e.g., the second seating surface 1162) supporting the antenna module, and wherein a distance (e.g., the distance d1 of FIG. 11) between the first seating surface and the second surface is greater than a distance (e.g., the distance d2 of FIG. 11) between the second surface and a point of the second seating surfaces farthest from the second surface.

According to an embodiment of the disclosure, the electronic device may further comprise a second supporting member surface (e.g., the second supporting member 1170) configured to face the second surface and support the cover plate, wherein the second supporting member may include a recess (e.g., the recess 1171 of FIG. 11) that accommodates a portion of the antenna module facing the second supporting member, and the recess may correspond to an outer surface of the portion of the antenna module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block,", "unit", "part,", "portion" or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a housing including a first surface on which a display is disposed, a second surface facing in the opposite direction to the first surface, and a side surface forming an internal space by surrounding a space between the first surface and the second surface;
  a key button structure in the housing at least partially exposed to the side surface; and
  an antenna module spaced from the key button structure to the internal space, and including a plurality of antenna elements, wherein the key button structure comprises:
  at least one key button partially exposed to the side surface, and capable of moving into the internal space when pressed,
  a flexible printed circuit board comprising a ground portion, and disposed between the at least one key button and the antenna module, and
  a dome pressed by the at least one key button as the at least one key button moves into the internal space, electrically connected to the flexible printed circuit board, and disposed on a region of the flexible printed circuit board, the region of the flexible printed circuit board corresponding to at least one region among regions of the antenna module located between each of the plurality of antenna elements, and
wherein the antenna module overlaps a portion of the flexible printed circuit board, when the key button structure is viewed perpendicularly.

2. The electronic device of claim 1, wherein the flexible printed circuit board comprises a plurality of contact pads overlapping each of the regions of the antenna module located between each of the plurality of antenna elements, when the key button structure is viewed perpendicularly.

3. The electronic device of claim 2, wherein the flexible printed circuit board includes a non-conductive material in regions overlapping with the plurality of antenna elements to space the plurality of contact pads apart.

4. The electronic device of claim 3, wherein the regions of the flexible printed circuit board overlapping with the plurality of antenna elements are fill-cut regions, when the electronic device is viewed from the side surface.

5. The electronic device of claim 1, further comprising:
a cover plate disposed on the second surface,
  wherein the antenna module is directed between the cover plate and the side surface to transmit signal emitted from the plurality of antenna elements to an outside of the electronic device.

6. The electronic device of claim 5,
  wherein the cover plate comprises a non-conductive material, and
  wherein the side surface comprises a conductive material.

7. The electronic device of claim 5,
  wherein the housing includes a supporting member supporting the at least one key button, the flexible printed circuit board, and the antenna module, and
  wherein the supporting member includes a first seating surface supporting the flexible printed circuit board and a second seating surface supporting the antenna module.

8. The electronic device of claim 7,
  wherein the first seating surface is parallel to the second surface, and
  wherein the second seating surface is inclined with respect to the second surface.

9. The electronic device of claim 7, wherein a distance between the first seating surface and the second surface is longer than a distance between the second surface and the furthest point of the second seating surfaces from the second surface.

10. The electronic device of claim 7, wherein the supporting member includes:
  a plurality of grooves recessed toward the first surface in regions overlapping the plurality of antenna elements, when the key button structure is viewed perpendicularly; and
  a plurality of protrusions protruding toward the second surface in regions overlapping each of the regions located between each of the plurality of antenna elements.

11. The electronic device of claim 10, wherein at least one of the plurality of protrusions supports the dome.

12. The electronic device of claim 1,
  wherein the side surface comprises a non-conductive material, and
  wherein one surface of the antenna module on which the antenna elements are disposed is substantially parallel to the side surface.

13. The electronic device of claim 12,
  wherein the housing includes a supporting member supporting the at least one key button, the flexible printed circuit board, and the antenna module, and
  wherein the supporting member includes a first seating surface supporting the flexible printed circuit board and a second seating surface supporting the antenna module.

14. The electronic device of claim 13, wherein the supporting member includes:
  a plurality of grooves recessed toward the first surface in regions overlapping with the plurality of antenna elements, when the key button structure is viewed perpendicularly; and
  a plurality of protrusions protruding toward the second surface in regions overlapping each of the regions located between each of the plurality of antenna elements.

15. The electronic device of claim 1, wherein a center of the dome is located between one antenna element among the plurality of antenna elements and another antenna element adjacent to the one antenna element.

16. The electronic device of claim 1,
  wherein the dome includes a first periphery parallel to the first surface and a second periphery contacting the first periphery and perpendicular to the first surface, and
  wherein a length of the first periphery is shorter than a length of the second periphery.

17. An electronic device comprising:
  a display;
  a cover plate opposite to the display;
  a housing including a first surface on which the display is disposed, a second surface on which the cover plate is disposed, and a side surface disposed between the first surface and the second surface;
  an antenna module in the housing including a plurality of antenna elements;
  a flexible printed circuit board disposed between the side surface and the antenna module, and comprising conductive thin film; and
  a dome electrically connected to the conductive film by an external force, and disposed on a region of the flexible printed circuit board, the region of the flexible printed circuit board corresponding to at least one region among regions of the antenna module located between each of the plurality of antenna elements,
  wherein the antenna module is directed between the cover plate and the side surface to transmit signal emitted from the plurality of antenna elements to an outside of the electronic device.

18. The electronic device of claim 17,
  wherein the cover plate comprises a non-conductive material, and
  wherein the side surface comprises a conductive material.

19. The electronic device of claim 17,
wherein the housing includes a first supporting member supporting the flexible printed circuit board and the antenna module,
wherein the first supporting member includes a first seating surface supporting the flexible printed circuit board and a second seating surface supporting the antenna module, and
wherein a distance between the first seating surface and the second surface is longer than a distance between the second surface and the furthest point of the second seating surfaces from the second surface.

20. The electronic device of claim 19, further comprising:
a second supporting member facing the second surface and supporting the cover plate,
wherein the second support member includes a recess that accommodates a portion of the antenna module facing the second support member, and
wherein the recess corresponds to an outer surface of the portion of the antenna module.

* * * * *